(12) United States Patent
Kubo

(10) Patent No.: US 10,948,334 B2
(45) Date of Patent: Mar. 16, 2021

(54) NON-CONTACT DISPLACEMENT SENSOR

(71) Applicant: MITUTOYO CORPORATION, Kanagawa (JP)

(72) Inventor: Koji Kubo, Tokyo (JP)

(73) Assignee: MITUTOYO CORPORATION, Kanagawa (JP)

( * ) Notice: Subject to any disclaimer, the term of this patent is extended or adjusted under 35 U.S.C. 154(b) by 75 days.

(21) Appl. No.: 16/527,486

(22) Filed: Jul. 31, 2019

(65) Prior Publication Data

US 2020/0049545 A1 Feb. 13, 2020

(30) Foreign Application Priority Data

Aug. 7, 2018 (JP) .............................. JP2018-148386

(51) Int. Cl.
*G01F 23/292* (2006.01)
*G01J 1/32* (2006.01)

(52) U.S. Cl.
CPC .............. *G01F 23/292* (2013.01); *G01J 1/32* (2013.01)

(58) Field of Classification Search
CPC . G01F 23/292; G01J 1/32; G02B 3/12; G02B 3/14; G02B 3/00; G02B 7/04; G02B 7/08; G02B 7/09; G02B 7/28; G02B 15/02; G02B 15/04; G02B 26/00; G02B 26/004; G01C 3/00; G01C 3/02; G01C 3/06; G01S 17/02; G01S 17/06; G01S 17/08

See application file for complete search history.

(56) References Cited

U.S. PATENT DOCUMENTS 4,830,498 A * 5/1989 Nishimoto ............... G01C 3/32
356/400
9,961,253 B2 * 5/2018 Bryll ................... H04N 5/2254
10,503,044 B1 * 12/2019 Watanabe ................ G02F 1/29
(Continued)

FOREIGN PATENT DOCUMENTS

| JP | H11-23219 A | 1/1999 |
| JP | 2009-122105 A | 6/2009 |
| JP | 2018-189700 A | 11/2018 |

OTHER PUBLICATIONS

U.S. Appl. No. 16/519,359 to Koji Kubo, filed Jul. 23, 2019.
(Continued)

*Primary Examiner* — John R Lee
(74) *Attorney, Agent, or Firm* — Greenblum & Bernstein, P.L.C.

(57) ABSTRACT

A non-contact displacement sensor includes a focus timing calculator that, calculates a measurement-side focus timing at which measurement light is focused on a surface of a measurable object, a first reference-side focus timing at which reference light is focused on a first reference surface, and a second reference-side focus timing at which the reference light is focused on a second reference surface; a characteristics calculator that calculates the refractive index characteristics of a liquid lens apparatus based on the first reference-side focus timing, the second reference-side focus timing, and an optical path length difference; and a position calculator that calculates a position of the measurable object based on the refractive index characteristics and a phase of the measurement-side focus timing relative to a period of a drive signal.

12 Claims, 15 Drawing Sheets

(56) References Cited

U.S. PATENT DOCUMENTS

| | | | |
|---|---|---|---|
| 10,816,755 B2* | 10/2020 | Sakai | G02B 15/04 |
| 10,830,585 B2* | 11/2020 | Kubo | H04N 5/23212 |
| 10,845,580 B2* | 11/2020 | Igasaki | G02B 15/14 |
| 2009/0268080 A1* | 10/2009 | Song | H04N 5/23212 348/349 |
| 2010/0177376 A1 | 7/2010 | Arnold et al. | |
| 2014/0009572 A1* | 1/2014 | Matsumoto | H04N 5/2356 348/36 |
| 2015/0145980 A1* | 5/2015 | Bryll | G02B 21/241 348/79 |
| 2017/0013185 A1* | 1/2017 | Gladnick | H04N 5/23296 |
| 2017/0285318 A1* | 10/2017 | Cho | G02B 21/361 |
| 2018/0180773 A1* | 6/2018 | Usami | G03B 5/00 |
| 2018/0180774 A1* | 6/2018 | Nagahama | G02B 3/14 |
| 2018/0286020 A1* | 10/2018 | Kawai | G02B 7/38 |
| 2018/0314033 A1* | 11/2018 | Sakai | G06F 3/048 |
| 2018/0314041 A1 | 11/2018 | Igasaki et al. | |
| 2018/0314042 A1* | 11/2018 | Igasaki | G02B 15/14 |
| 2019/0075247 A1* | 3/2019 | Vink | G06T 5/50 |
| 2019/0121056 A1* | 4/2019 | Nagahama | G02F 1/29 |
| 2019/0271898 A1* | 9/2019 | Sakai | G02F 1/29 |
| 2019/0353872 A1* | 11/2019 | Sakai | H04N 5/2254 |
| 2019/0353976 A1* | 11/2019 | Watanabe | H04N 5/2254 |
| 2019/0356860 A1* | 11/2019 | Sakai | G02B 26/004 |
| 2020/0041267 A1* | 2/2020 | Kubo | G01C 3/02 |
| 2020/0041757 A1* | 2/2020 | Kubo | G02B 21/082 |
| 2020/0049545 A1* | 2/2020 | Kubo | G01F 23/292 |
| 2020/0073024 A1* | 3/2020 | Igasaki | G02F 1/33 |
| 2020/0073025 A1* | 3/2020 | Igasaki | G02B 3/14 |
| 2020/0208965 A1* | 7/2020 | Yoshida | G01B 11/24 |

OTHER PUBLICATIONS

U.S. Appl. No. 16/549,323 to Shiro Igasaki et al., filed Aug. 23, 2019.

U.S. Appl. No. 16/414,148 to Hiroshi Sakai et al., filed May 16, 2019.

U.S. Appl. No. 16/556,546 to Shiro Igasaki et al., filed Aug. 30, 2019.

U.S. Appl. No. 16/519,117 to Koji Kubo et al., filed Jul. 23, 2019.

\* cited by examiner

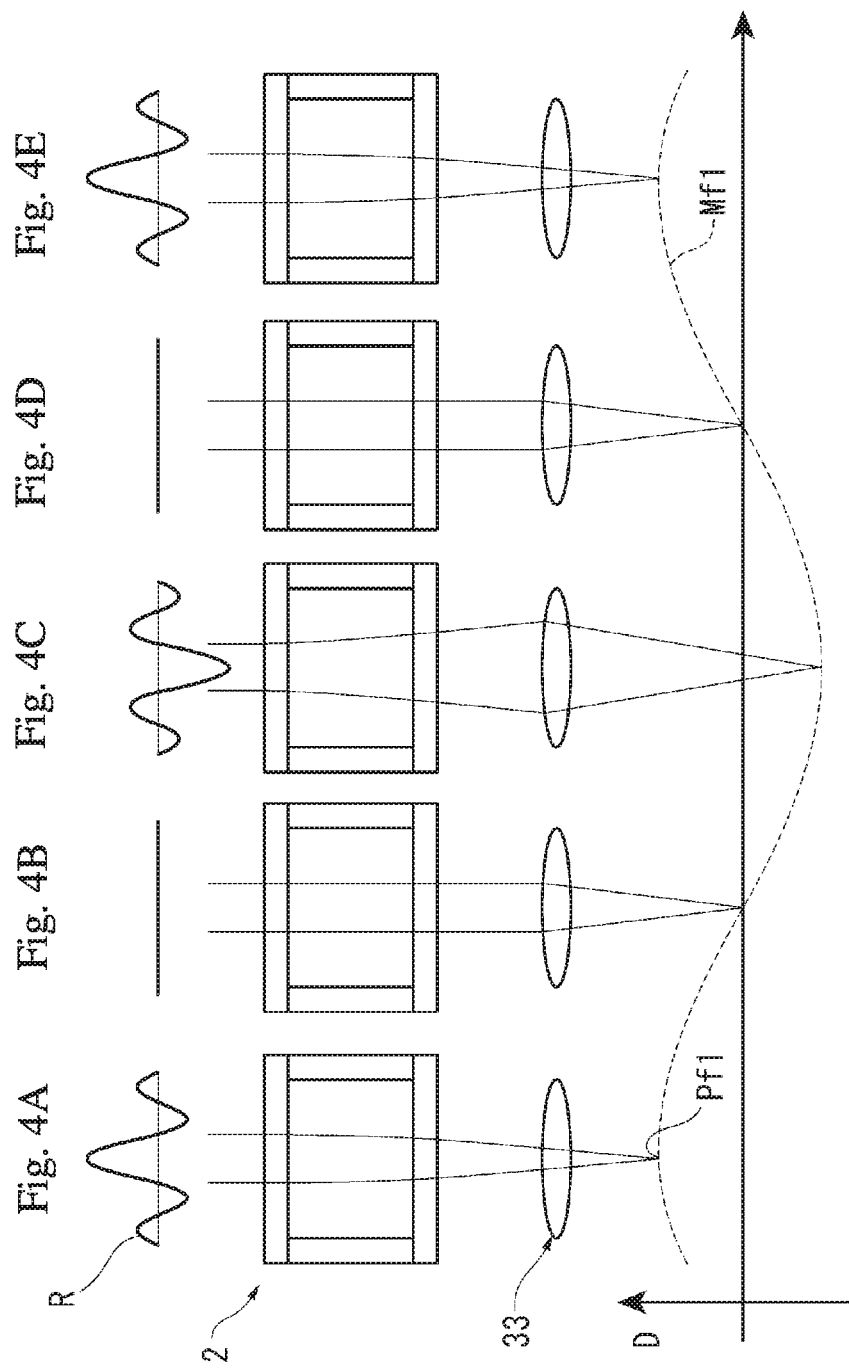

Fig. 10

| Measured object position Zk (display value) | Measured object position Zcalc,k (computed value) |
|---|---|
| Z1 | Zcalc,1 |
| Z2 | Zcalc,2 |
| Z3 | Zcalc,3 |
| ... | ... |
| Zn | Zcalc,n |

NON-CONTACT DISPLACEMENT SENSOR

CROSS-REFERENCE TO RELATED APPLICATIONS

The present application claims priority under 35 U.S.C. § 119 of Japanese Application No. 2018-148386, filed on Aug. 7, 2018, the disclosure of which is expressly incorporated by reference herein in its entirety.

BACKGROUND OF THE INVENTION

1. Field of the Invention

The present invention relates to a non-contact displacement sensor.

2. Description of Related Art

Conventionally, as a non-contact displacement sensor that measures displacement of a surface of a measured object/measurable object/object to be measured, a laser displacement sensor, a chromatic point sensor, and the like are available. In such a non-contact displacement sensor, a distance to the surface of the measured object is found by detecting reflected light from the measured object while changing a focus position of measurement light.

For example, a laser displacement sensor uses a confocal method or the like, and changes a focus position by driving an objective lens along an optical axis. Then, based on information for a position of the objective lens on the optical axis when measurement light reflected by a surface of a measured object is detected, the sensor finds the distance to the surface of the measured object (see Japanese Patent Laid-open Publication No. H11-23219, for example). On the other hand, a chromatic point sensor uses the white confocal method, and changes a focus position for each wavelength by scattering a white light source using axial chromatic aberration. Then, by analyzing an intensity profile for each wavelength, wavelength light that is focused at the surface of the measured object is detected and the distance to the surface of the measured object is found based on the wavelength light (see Japanese Patent Laid-open Publication No. 2009-122105, for example).

In recent years, variable focal length lenses that use a liquid lens system in which the refractive index changes periodically (hereafter referred to simply as a "lens system") have been developed (see, for example, the specification of U.S. Patent Application Publication No. 2010/0177376). The lens system is formed by immersing in transparent liquid a hollow cylindrical oscillating member that is formed of a piezoelectric material. In the lens system, when AC voltage is applied to an inner circumferential surface and outer circumferential surface of the oscillating member, the oscillating member expands and contracts in a thickness direction and oscillates the liquid inside the oscillating member. By adjusting a frequency of the applied voltage according to the natural frequency of the liquid, a standing wave of concentric circles is formed in the liquid and concentric circular regions having different refractive indexes are formed centered on a center axis line of the oscillating member. Therefore, in the lens system, when light transits along the center axis line of the oscillating member, the light travels along a path that either disperses or converges the light in accordance with the refractive index of each concentric circular region.

The lens system described above and an objective lens for bringing the light into focus (for example, an ordinary convex lens or a group of lenses) are arranged on the same optical axis to configure a variable focal length lens. When parallel light strikes the ordinary objective lens, light passing through the lens comes into focus at a focal point position that lies at a predetermined focal length. In contrast, when parallel light strikes the lens system arranged coaxially with the objective lens, the light is either dispersed or converged by the lens system and the light transiting the objective lens comes into focus at a position offset either farther away or closer than the original (state with no lens system) focal point position. Accordingly, in the variable focal length lens, a drive signal (AC voltage of a frequency that generates a standing wave in the interior liquid) that is input to the lens system is applied, and by increasing or decreasing the amplitude of the drive signal, the focal point position of the variable focal length lens can be controlled as desired within a set range (a predetermined variable range by which the lens system can increase or decrease the focal point position, with the focal length of the objective lens as a reference).

The following circumstances exist in the conventional non-contact displacement sensors noted above. The laser displacement sensor requires a lens driving mechanism that drives the objective lens and a scale for measuring a drive amount of the lens driving mechanism, which may complicate the configuration of the laser displacement sensor. On the other hand, while the chromatic point sensor does not require a lens driving mechanism or a scale, there is an increased amount of data processing in order to analyze the intensity profile for each wavelength.

In order to resolve the issues with the conventional non-contact displacement sensors, the inventors of the present invention investigated using the variable focal length lens described above in a non-contact displacement sensor. However, when the variable focal length lens is affected by the passage of time, fluctuations in temperature, and the like, characteristics such as a variable range of a focal length may change. Therefore, in a non-contact displacement sensor that utilizes a variable focal length lens, there is a possibility that measurement accuracy may be reduced by changes in characteristics of the variable focal length lens.

SUMMARY OF THE INVENTION

The present invention provides a non-contact displacement sensor in which a configuration and processing can be simplified, and in which measurement accuracy is improved.

A non-contact displacement sensor according to the present invention is provided with: a light source that emits light; a liquid lens apparatus in which the refractive index periodically changes in response to an input drive signal; a beam splitter that splits light that is emitted from the light source and transits through the liquid lens apparatus into measurement light and reference light; a measurement-side objective lens that emits the measurement light split by the beam splitter at a measured object; a reference-side objective lens on which the reference light split by the beam splitter is incident; a reference light optical path portion which includes a first reference portion and a second reference portion each having a mutually distinct optical path length measured from the reference-side objective lens, and in which the reference light that passes through the reference-side objective lens is incident on each of the first reference portion and the second reference portion; a photodetector that receives the measurement light reflected by the measured object and the reference light that has traveled by way of the reference light optical path portion, and outputs a photodetection signal; a focus timing calculator that, based on the photodetection signal, calculates a measurement-side focus timing at which the measurement light is focused on the surface of the measured object, a first reference-side focus timing at which the reference light is focused on the first reference portion, and a second reference-side focus timing at which the reference light is focused on the second reference portion; a characteristics calculator that calculates the refractive index characteristics of the liquid lens apparatus based on the first reference-side focus timing, the second reference-side focus timing, and an optical path length difference, which is a difference between an optical path length running from the reference-side Objective lens to the first reference portion and the optical path length running from the reference-side objective lens to the second reference portion; and a position calculator that calculates a position of the measured object based on the refractive index characteristics and a phase of the measurement-side focus timing relative to a period of the drive signal.

In such a configuration, the liquid lens apparatus includes the lens system noted above and the refractive index periodically changes in response to the input drive signal. The liquid lens apparatus, together with the measurement-side objective lens, configures a measurement-side variable focal length lens. The focus position of the measurement-side variable focal length lens changes periodically in response to the drive signal that is input to the liquid lens apparatus. Therefore, of the light that is emitted from the light source and passes through the liquid lens apparatus, the measurement light that is split by the beam splitter passes through the measurement-side objective lens and is emitted at the measured object while changing a condensing position in an optical axis direction. The measurement light that is emitted at the measured object focuses on the surface of the measured object with a timing based on the position of the surface of the measured object, in accordance with the periodic change in the focus position formed by the measurement-side variable focal length lens.

Also, the liquid lens apparatus, together with the reference-side objective lens, configures a reference-side variable focal length lens. The focus position formed by the reference-side variable focal length lens changes periodically in response to the drive signal that is input to the liquid lens apparatus. Therefore, of the light that is emitted from the light source and passes through the liquid lens apparatus, the reference light that is split by the beam splitter passes through the reference-side objective lens and enters the reference light optical path portion while changing the condensing position in the optical axis direction. The reference light that enters the reference light optical path portion focuses on each of the first reference portion and the second reference portion at a predetermined timing in accordance with the periodic change of the focus position formed by the reference-side variable focal length lens.

The photodetector receives the measurement light that is reflected by the measured object as well as the reference light that has traveled by way of the reference light optical path portion and outputs a photodetection signal. Based on the photodetection signal, the focus timing calculator calculates the measurement-side focus timing at which the measurement light is focused on the surface of the measured object, the first reference-side focus timing at which the reference light is focused on the first reference portion, and the second reference-side focus timing at which the reference light is focused on the second reference portion. A method for finding each of the measurement-side focus timing and reference-side focus timing can utilize various focal point detection methods such as a confocal method, a double pinhole method, an astigmatic method, and a knife edge method. For example, when employing a confocal method to find the measurement-side focus timing, the liquid lens apparatus, the measurement-side objective lens, and the photodetector configure an optical system in which the photodetection signal peaks when the focus position formed by the measurement-side variable focal length lens coincides with the surface of the measured object. Accordingly, the focus timing calculator can calculate a peak time of the photodetection signal caused by the measurement light as the measurement-side focus timing. The same applies to a method of finding the first reference-side focus timing and the second reference-side focus timing, as well.

In this example, the optical path length between the reference-side objective lens and the first reference portion and the optical path length between the reference-side objective lens and the second reference portion are different from each other. Therefore, a time difference may arise between the first reference-side focus timing and the second reference-side focus timing, based on the optical path length difference between the optical path length running from the reference-side objective lens to the first reference portion and the optical path length running from the reference-side objective lens to the second reference portion. This time difference changes in response to changes in the refractive index characteristics of the liquid lens apparatus. Accordingly, the characteristics calculator can calculate the refractive index characteristics of the liquid lens apparatus based on the first reference-side focus timing and the second reference-side focus timing.

Furthermore, the phase of the measurement-side focus timing relative to the period of the drive signal corresponds to the position of the surface of the measured object on the optical axis running through the measurement-side objective lens. The position calculator calculates the position of the measured object based on the refractive index characteristics and the phase of the measurement-side focus timing relative to the period of the drive signal. In other words, when calculating the position of the measured object that corresponds to the phase of the measurement-side focus timing, an accurate position of the measured object can be calculated by performing correction in accordance with the refractive index characteristics.

As noted in the foregoing, in the present invention, the measurement-side variable focal length lens is configured by the liquid lens apparatus and the measurement-side objective lens. Therefore, the present invention does not require use of a lens driving mechanism and a scale that are required structures in a conventional laser displacement sensor. In addition, the position of the measured object can be calculated using the photodetection signals from the measurement light and the reference light, and therefore, the processing of a large amount of data that is performed in a conventional chromatic point sensor is unnecessary. Moreover, in the present invention, the liquid lens apparatus, together with the reference-side objective lens, configures the reference-side variable focal length lens, and the refractive index characteristics of the liquid lens apparatus can be calculated using the photodetection signal caused by the reference light. Therefore, when calculating the position of the measured object, by performing correction in accordance with a change in the refractive index characteristics, the influence of the passage of time or environmental changes such as temperature can be reduced (improved robustness). Thus, according to the present invention, a non-contact displacement sensor is provided in which the configuration and processing can be simplified, and in which measurement accuracy is improved.

In the non-contact displacement sensor according to the present invention, preferably, a benchmark signal outputter that outputs a benchmark signal synchronized with the drive signal is further provided; the characteristics calculator calculates the refractive index characteristics of the liquid lens apparatus based on a delay time of the first reference-side focus timing relative to the benchmark signal and a delay time of the second reference-side focus timing relative to the benchmark signal; and the position calculator calculates the phase of the measurement-side focus timing based on a delay time of the measurement-side focus timing relative to the benchmark signal. In the present invention, the refractive index characteristics of the liquid lens apparatus and the phase of the measurement-side focus timing can be easily found even without performing complex computation.

In the non-contact displacement sensor according to the present invention, preferably, the reference light optical path portion is provided with a partial reflecting mirror having, as the first reference portion, a first reference surface that reflects a portion of the reference light; and a reflecting mirror having, as the second reference portion, a second reference surface that reflects the reference light that passes through the first reference surface. In the present invention, by utilizing the partial reflecting mirror and the reflecting minor, the optical path length between the first reference surface and the second reference surface (that is, the optical path length difference utilized by the characteristics calculator) is easily and accurately defined.

In the non-contact displacement sensor according to the present invention, preferably, the reference light optical path portion is provided with a reference light optical path splitter that splits the reference light that passes through the reference-side objective lens; a first optical fiber having, as the first reference portion, a first reference end face where a first reference light that is split by the reference light optical path splitter is incident; and a second optical fiber having, as the second reference portion, a second reference end face where a second reference light that is split by the reference light optical path splitter is incident. In the present invention, by utilizing the first optical fiber and the second optical fiber, optical components such as mirrors can be omitted, and therefore costs can be reduced.

In the non-contact displacement sensor according to the present invention, the light source may include a measurement light source that emits the measurement light and a reference light source that emits the reference light, and the photodetector may include a measurement light photodetector that receives the measurement light reflected by the measured object and that outputs the photodetection signal caused by the measurement light, and a reference light photodetector that receives the reference light which travels by way of the reference light optical path portion and that outputs the photodetection signal caused by the reference light. In the present invention, the photodetection signal caused by the measurement light and the photodetection signal caused by the reference light can be readily distinguished, and thus computation in the signal processor is simplified.

According to the present invention, a non-contact displacement sensor is provided in which a configuration and processing can be simplified, and in which measurement accuracy is improved.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIGS. 4A to 4E are schematic views illustrating focus positions of the liquid lens apparatus according to the first embodiment;

FIG. 10 illustrates a calibration table according to the first embodiment;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Hereafter, various embodiments of the present invention are described with reference to the drawings.

First Embodiment (Non-Contact Displacement Sensor)

Figure 1:
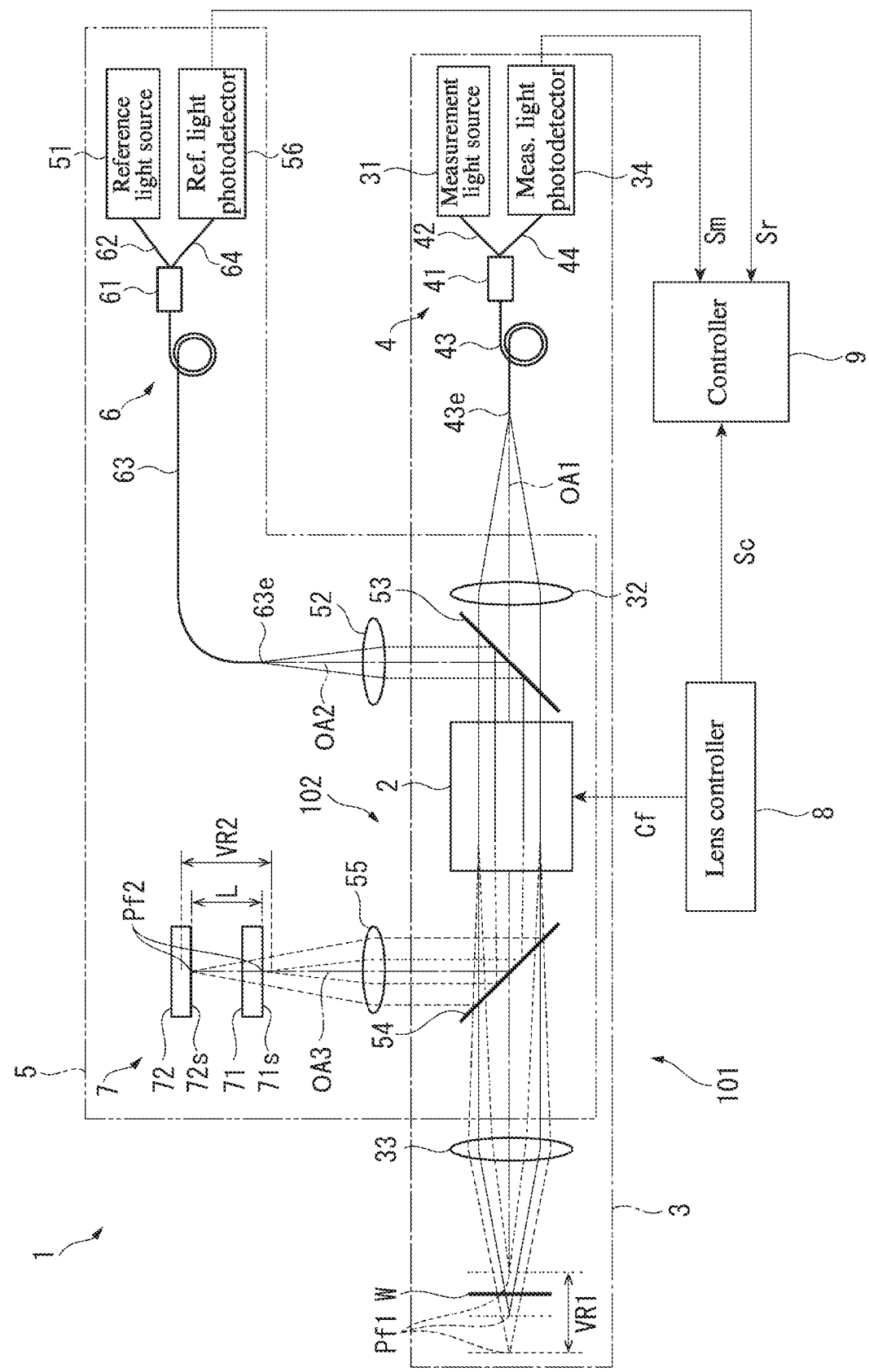
FIG. 1 is a schematic view illustrating a non-contact displacement sensor according to a first embodiment of the present invention.

As illustrated in FIG. 1, a non-contact displacement sensor 1 is configured to include a liquid lens apparatus 2 in which a refractive index periodically changes, and the non-contact displacement sensor 1 measures a positional change of a surface of a measured object W that is arranged intersecting with an optical axis OA1 that runs through the liquid lens apparatus 2. In addition, the non-contact displacement sensor 1 is configured so as to measure the positional change of the surface of the measured object W while measuring characteristics of the liquid lens apparatus 2, and inhibits the influence of changes in the characteristics of the liquid lens apparatus 2 on measurement results for the measured object W.

Specifically, the non-contact displacement sensor 1 includes a measurement system 3 that measures the positional change of the measured object W. The measurement system 3 is provided with a measurement light source 31 that emits measurement light, an optical system (a collimating lens 32 and an optical guide 4) that forms an optical path for the measurement light, a measurement-side objective lens 33 configuring a measurement-side variable focal length lens 101 together with the liquid lens apparatus 2, and a measurement light photodetector 34 receiving the measurement light that is reflected by the measured object W. In addition, the non-contact displacement sensor 1 includes a reference system 5 that measures characteristics of the liquid lens apparatus 2. The reference system 5 is provided with a reference light source 51 that emits reference light, an optical system (a collimating lens 52, an optical guide 6, and beam splitters 53 and 54) that forms an optical path for the reference light, a reference-side objective lens 55 configuring a reference-side variable focal length lens 102 together with the liquid lens apparatus 2, a reference light optical path portion (reference light optical system) 7 where the reference light that passes through the reference-side objective lens 55 is incident, and a reference light photodetector 56 receiving the reference light that arrives via the reference light optical path portion 7. The measurement light source 31 and the reference light source 51 are equivalent to light sources according to the present disclosure. The measurement light photodetector 34 and the reference light photodetector 56 are equivalent to photodetectors according to the present disclosure.

Moreover, the non-contact displacement sensor 1 is provided with a lens controller 8 that controls operations of the liquid lens apparatus 2 and a controller 9 that operates the lens controller 8. The controller 9 also imports and processes photodetection signals Sm and Sr, and calculates a position of the surface of the measured object W on the optical axis OA1 while measuring the characteristics of the liquid lens apparatus 2.

The liquid lens apparatus 2 is configured with a liquid lens system on an interior thereof, and a refractive index changes in response to an input drive signal Cf. The drive signal Cf is a sinusoidal AC signal of a frequency that generates a standing wave in the liquid lens apparatus 2. A focus position Pf1 formed by the measurement-side variable focal length lens 101 (which is an assembly of the liquid lens apparatus 2 and the measurement-side objective lens 33), while based on a focal point position of the measurement-side objective lens 33, can be changed as desired by changing the refractive index of the liquid lens apparatus 2. Meanwhile, a focus position Pf2 formed by the reference-side variable focal length lens 102 (which is an assembly of the liquid lens apparatus 2 and the reference-side objective lens 55), while based on a focal point position of the reference-side objective lens 55, can be changed as desired by changing the refractive index of the liquid lens apparatus 2.

(Variable Focal Length Lens)

Figure 2:
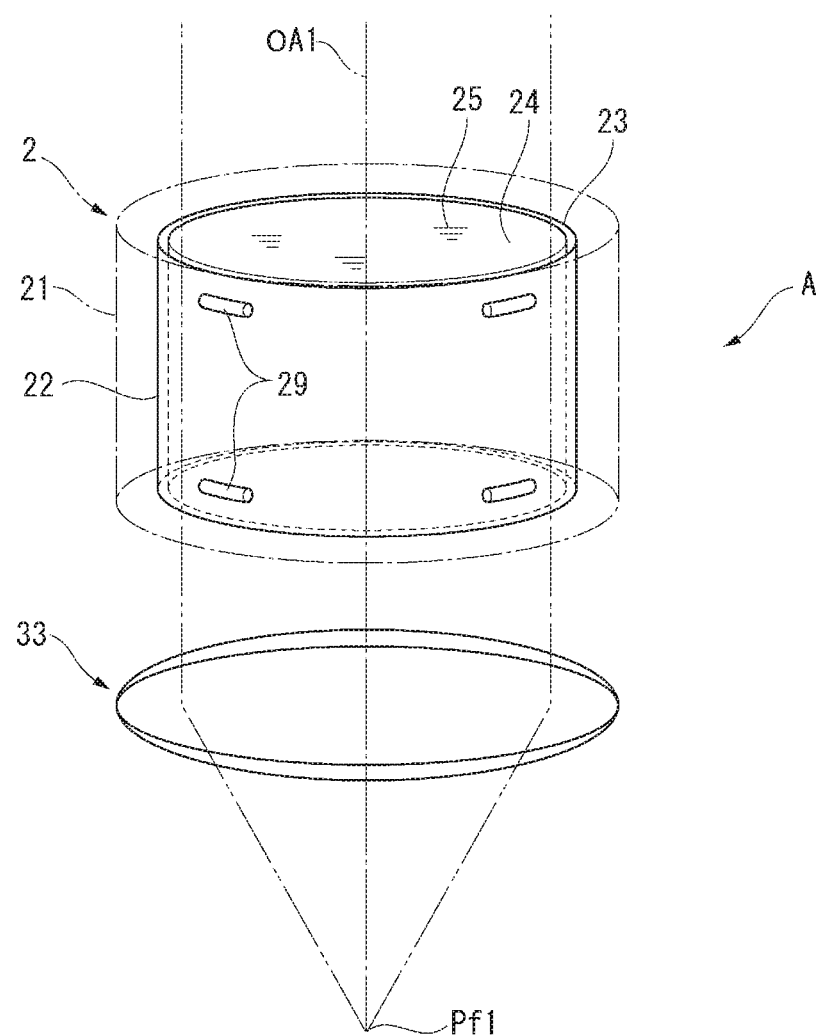
FIG. 2 is a schematic view illustrating a configuration of a liquid lens apparatus according to the first embodiment.

The liquid lens apparatus 2 and the measurement-side variable focal length lens 101 that is configured to include the liquid lens apparatus 2 are now described with reference to FIG. 2. In FIG. 2, the lens apparatus 2 includes a hollow cylindrical case 21, and a hollow cylindrical oscillating member 22 is installed on an interior of the case 21. The oscillating member 22 is supported by spacers 29 that are made of an elastomer and are disposed between an outer circumferential surface 23 of the oscillating member 22 and an inner circumferential surface 24 of the case 21. The oscillating member 22 is a member where a piezoelectric material is formed in a hollow cylindrical shape. The oscillating member 22 oscillates in a thickness direction due to an AC voltage of the drive signal Cf being applied between the outer circumferential surface 23 and the inner circumferential surface 24. The interior of the case 21 is filled with a highly transparent liquid 25, the entire oscillating member 22 is immersed in the liquid 25, and an inner side of the hollow cylindrical oscillating member 22 is filled with the liquid 25. The AC voltage of the drive signal Cf is adjusted to a frequency that generates a standing wave in the liquid 25 on the inner side of the oscillating member 22.

Figures 3A, 3B, 3C:
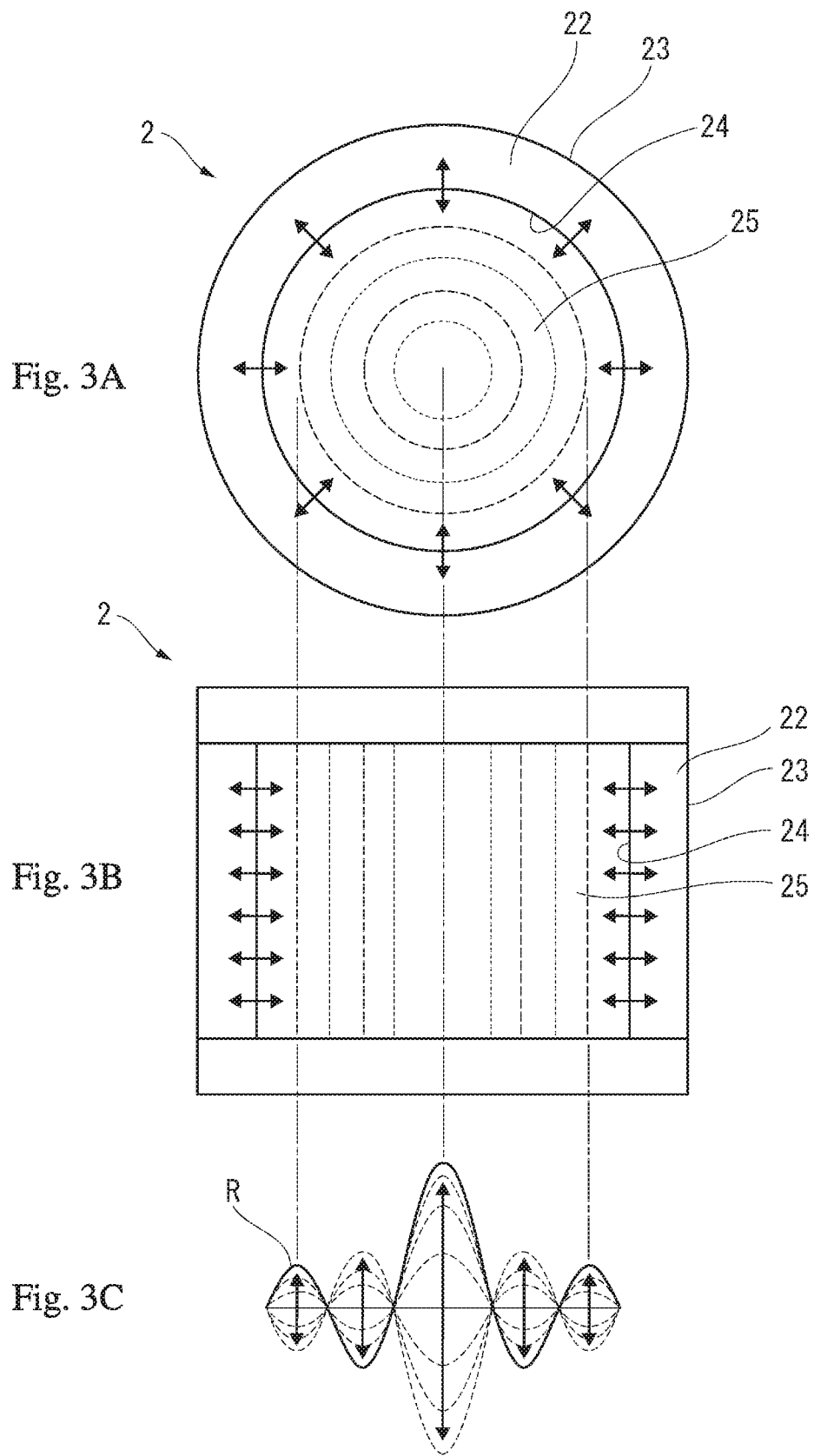
FIGS. 3A to 3C are schematic views illustrating oscillation states of the liquid lens apparatus according to the first embodiment.

As shown in FIGS. 3A to 3C, in the liquid lens apparatus 2, when the oscillating member 22 is oscillated, a standing wave arises in the interior liquid 25 and concentric circular regions arise in which the refractive index alternates (see FIGS. 3A and 3B). At this point, a relationship between a distance from a center axis line of the liquid lens apparatus 2 (radius) and the refractive index of the liquid 25 is as shown by a refractive index distribution R illustrated in FIG. 3C.

In FIGS. 4A to 4E, because the drive signal Cf is a sinusoidal AC signal, bands in the refractive index distribution R of the liquid 25 in the liquid lens apparatus 2 also change in accordance with the drive signal Cf. Also, the refractive index of the concentric circular regions that arise in the liquid 25 changes sinusoidally, and accordingly the focus position Pf1 fluctuates sinusoidally. In FIGS. 4A to 4E, a distance D from the focal point position of the measurement-side objective lens 33 to the focus position Pf1 is shown. In the state depicted in FIG. 4A, an amplitude of the refractive index distribution R is at its largest, the liquid lens apparatus 2 causes transiting light to converge, and the focus position Pf1 is the closest to the measurement-side Objective lens 33. In the state depicted in FIG. 4B, the refractive index distribution R is flat, the liquid lens apparatus 2 allows transiting light to transit unaffected, and the focus position Pf1 is at a standard value. In the state depicted in FIG. 4C, the amplitude of the refractive index distribution R is at its largest at the opposite pole from that of FIG. 4A, the liquid lens apparatus 2 causes transiting light to diffuse, and the focus position Pf1 is at its farthest from the measurement-side objective lens 33. In the state depicted in FIG. 4D, once again the refractive index distribution R is flat, the liquid lens apparatus 2 allows transiting light to transit unaffected, and the focus position Pf1 is at the standard value. The state depicted in FIG. 4E returns once again to the state depicted in FIG. 4A and similar fluctuations are repeated thereafter.

In this way, in the measurement-side variable focal length lens 101, the drive signal Cf is a sinusoidal AC signal, and the focus position Pf1 fluctuates sinusoidally, as in a fluctuation waveform Mf1 in FIGS. 4A to 4E.

There may also be cases where, in the measurement-side variable focal length lens 101, a principal point of the measurement-side variable focal length lens 101 fluctuates, whereby the focus position Pf1 changes while the focal length (distance from the principal point of the measurement-side variable focal length lens 101 to the focus position Pf1) remains constant. The measurement-side variable focal length lens 101 is described above, but a similar description is also applicable for the reference-side variable focal length lens 102.

(Measurement System)

Referring to FIG. 1 again, various configurations of the measurement system 3 in the non-contact type displacement sensor 1 are described. The measurement light source 31 is a laser light source, for example, and emits measurement light. The optical guide 4 includes a fiber splitter 41 and optical fibers 42 to 44. The fiber splitter 41 has an optical path where a first end portion of each of the optical fibers 42 to 44 are connected, and is configured so as to guide the light that is incident from the optical fiber 42 to the optical fiber 43, and guide the light that is incident from the optical fiber 43 to the optical fiber 44.

A second end portion of the optical fiber 42 is connected to the measurement light source 31. Therefore, the measurement light emitted from the measurement light source 31 transits the optical fiber 42, the fiber splitter 41, and the optical fiber 43, and is emitted from an end face 43e of the second end portion of the optical fiber 43. That is, the end face 43e of the optical fiber 43 carries out operations as a point light source of measurement light. In addition, the second end portion of the optical fiber 44 is connected to the measurement light photodetector 34. Therefore, the measurement light incident on the end face 43e of the optical fiber 43 transits the optical fiber 43, the fiber splitter 41, and the optical fiber 44, and is incident on the measurement light photodetector 34. In this example, the end face 43e of the optical fiber 43 is positioned at a focal point on a rear side of the collimating lens 32. In other words, the end face 43e of the optical fiber 43 is arranged at a position that creates a conjugate relationship with respect to the focus position Pf1 formed by the measurement-side variable focal length lens 101, on the optical axis OA1.

The collimating lens 32 is positioned on the optical axis OA1, converts the measurement light emitted from the end face 43e of the optical fiber 43 into parallel light, and causes the light to strike the liquid lens apparatus 2. Also, the collimating lens 32 collects the measurement light that is reflected by the measured object W and passes through the liquid lens apparatus 2 again.

The measurement-side objective lens 33 is configured by a known convex lens or lens group, is positioned between the liquid lens apparatus 2 and the measured object W on the optical axis OA1, and, together with the liquid lens apparatus 2, configures the measurement-side variable focal length lens 101 described above. The measured object W is arranged inside a variable range VR1 of the focus position Pf1 formed by the measurement-side variable focal length lens 101. The measurement-side objective lens 33 is not made integral with other structures, but instead is configured to be swappable for separate measurement-side objective lenses 33 having different powers of magnification.

The measurement light photodetector 34 may be a photomultiplier tube or a photodiode, for example, and is connected to the second end portion of the optical fiber 44. The measurement light photodetector 34 receives the measurement light incident via the optical fiber 44 and outputs a photodetection signal Sm in accordance with the intensity of the received light.

In the measurement system 3 noted above, the measurement light emitted from the end face 43e of the optical fiber 43 is collimated along the optical axis OA1 by the collimating lens 32, after which the light is emitted at the measured object W via the measurement-side variable focal length lens 101. The measurement light reflected by the measured object W is collected by the collimating lens 32 after once again transiting the measurement-side variable focal length lens 101. In this example, the focus position Pf1 formed by the measurement-side variable focal length lens 101 periodically changes on the optical axis OA1. Therefore, only when the focus position Pf1 coincides with the surface of the measured object W does the measurement light reflected by the surface form a spot at the focal point on the rear side of the collimating lens 32 and strike the end face 43e of the optical fiber 43. Accordingly, the measurement light incident on the measurement light photodetector 34 is maximized when the focus position Pf1 coincides with the surface of the measured object W. In other words, the photodetection signal Sm output from the measurement light photodetector 34 exhibits a peak when the focus position Pf1 coincides with the surface of the measured object W.

(Reference System)

Referring to FIG. 1, various configurations of the reference system 5 in the non-contact displacement sensor 1 are now described. The reference light source 51 is a laser light source, for example, and emits reference light having a different wavelength from the measurement light. The optical guide 6 includes a fiber splitter 61 and optical fibers 62 to 64. The fiber splitter 61 has an optical path where a first end portion of each of the optical fibers 62 to 64 are connected, and is configured so as to guide the light that is incident from the optical fiber 62 to the optical fiber 63, and guide the light that is incident from the optical fiber 63 to the optical fiber 64.

A second end portion of the optical fiber 62 is connected to the reference light source 51. Therefore, the reference light emitted from the reference light source 51 transits the optical fiber 62, the fiber splitter 61, and the optical fiber 63, and is emitted from an end face 63e of the second end portion of the optical fiber 63. That is, the end face 63e of the optical fiber 63 carries out operations as a point light source of reference light. In addition, the second end portion of the optical fiber 64 is connected to the reference light photodetector 56. Therefore, the measurement light incident on the end face 63e of the optical fiber 63 transits the optical fiber 63, the fiber splitter 61, and the optical fiber 64, and is incident on the reference light photodetector 56. In this example, the end face 63e of the optical fiber 63 is positioned at a focal point on a rear side of the collimating lens 52 on an optical axis OA2. In other words, the end face 63e of the optical fiber 63 is arranged at a position that creates a conjugate relationship with respect to the focus position Pf2 formed by the reference-side variable focal length lens 102.

The collimating lens 52 is positioned on the optical axis OA2, converts the measurement light emitted from the end face 63e of the optical fiber 63 into parallel light, and causes the light to strike the liquid lens apparatus 2 via the beam splitter 53. Also, the collimating lens 52 collects the reference light that passes by way of the reference light optical path portion 7 and through the liquid lens apparatus 2 again.

The beam splitters 53 and 54 may be beam splitters or dichroic mirrors, for example, and act to allow measurement light to pass through and also to reflect reference light. The beam splitters 53 and 54 are arranged so as to have the liquid lens apparatus 2 therebetween on the optical axis OA1, and the splitters form optical axes OA2 and OA3, which are split off from the optical axis OA1 before and after the liquid lens apparatus 2, respectively.

The reference-side objective lens 55 is configured by a known convex lens or lens group, is positioned between the liquid lens apparatus 2 and the reference light optical path portion 7 on the optical axis OA3, and, together with the liquid lens apparatus 2, configures the reference-side variable focal length lens 102 described above.

The reference light optical path portion 7 is provided with a partial reflecting mirror 71 and a reflecting mirror 72 on the optical axis OA3, each mirror having a mutually distinct optical path length measured from the reference-side objective lens 55. The partial reflecting minor 71 is arranged on a side closer to the reference-side objective lens 55, and includes a first reference surface 71s (first reference portion) that reflects a portion of the reference light and also allows another portion thereof to pass through. The reflecting minor 72 is arranged on a side farther from the reference-side objective lens 55, and includes a second reference surface 72s (second reference portion) that reflects the reference light that passes through the partial reflecting minor 71. A known value is defined for an optical path length between the first reference surface 71s and the second reference surface 72s (that is, for an optical path length difference L, which is the difference between the optical path length running from the reference-side objective lens 55 to the first reference surface 71s and the optical path length running from the reference-side objective lens 55 to the second reference surface 72s). The position of each of the first reference surface 71s and the second reference surface 72s can be set as desired, so long as the position is within a variable range VR2 of the focus position Pf2 formed by the reference-side variable focal length lens 102.

The reference light photodetector 56 may be a photomultiplier tube or a photodiode, for example, and is connected to the second end portion of the optical fiber 64. The reference light photodetector 56 receives the reference light incident via the optical fiber 64 and outputs a photodetection signal Sr in accordance with the intensity of the received light.

In the reference system 5 noted above, the reference light emitted from the end face 63e of the optical fiber 63 is collimated along the optical axis OA2 by the collimating lens 52, after which the light is bent toward the object side of the optical axis OA1 direction by the beam splitter 53. Then, the reference light passes through the liquid lens apparatus 2 and is bent in the optical axis OA3 direction by the beam splitter 54, after which the light enters the reference light optical path portion 7 while being collected by the reference-side objective lens 55. The reference light that enters the reference light optical path portion 7 is split into a first reference light that is reflected by the first reference surface 71s and a second reference light that passes through the first reference surface 71s and is then reflected by the second reference surface 72s. The first and second reference lights that are reflected by the first reference surface 71s or the second reference surface 72s follow the reverse path, and then are collected by the collimating lens 52. In this example, the focus position Pf2 formed by the reference-side variable focal length lens 102 periodically changes in the optical axis OA3 direction. Therefore, only when the focus position Pf2 coincides with the reference surface of either the first reference surface 71s or the second reference surface 72s does the first or second reference light reflected by the corresponding reference surface form a spot at the focal point on the rear side of the collimating lens 52 and strike the end face 63e of the optical fiber 63. Accordingly, the reference light incident on the reference light photodetector 56 is maximized when the focus position Pf2 coincides with either the first reference surface 71s or the second reference surface 72s. In other words, the photodetection signal Sr output from the reference light photodetector 56 exhibits a peak when the focus position Pf2 coincides with either the first reference surface 71s or the second reference surface 72s.

(Lens Controller)

Figure 5:
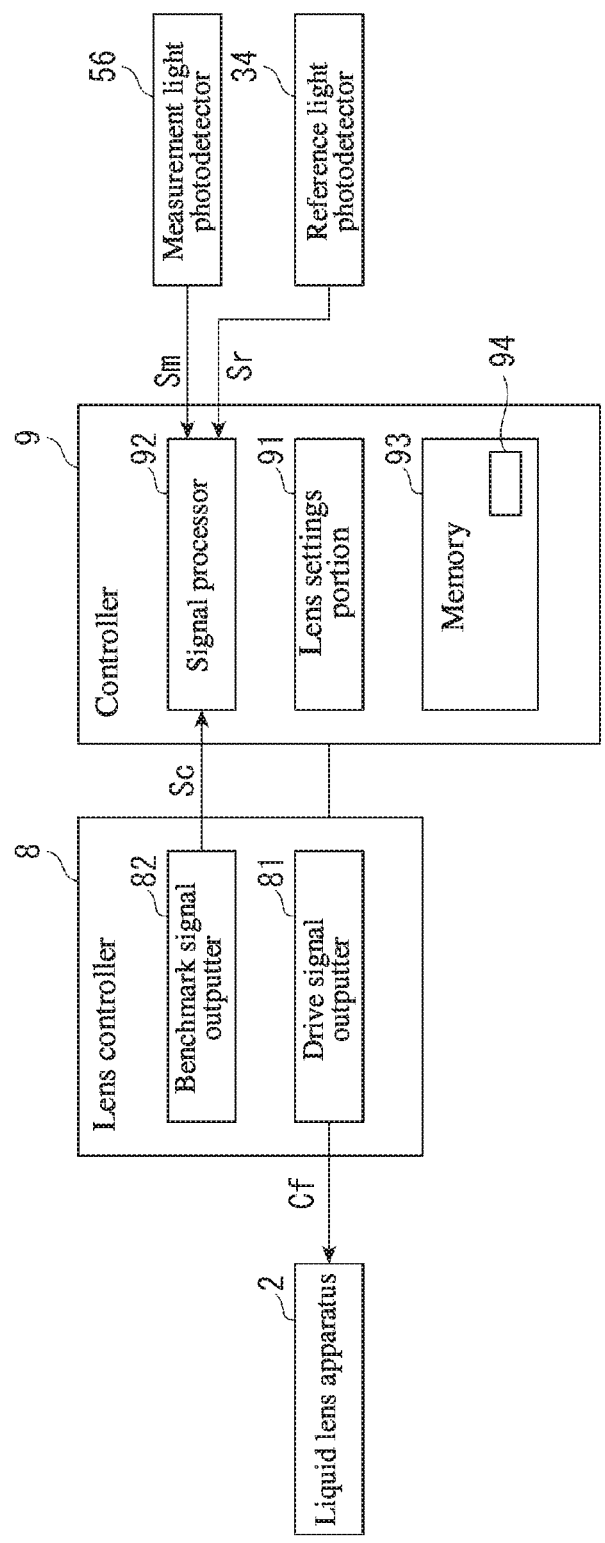
FIG. 5 is a block diagram schematically illustrating a lens controller and a controller according to the first embodiment.

As illustrated in FIG. 5, the lens controller 8 is configured as a control device that controls the operation of the liquid lens apparatus 2 and includes a drive signal outputter 81 outputting the sinusoidal drive signal Cf to the liquid lens apparatus 2. In addition, the lens controller 8 includes a benchmark signal outputter 82 outputting, to the controller 9, a pulse-like benchmark signal Sc that is synchronized with the period of the drive signal Cf. The timing of the output of the benchmark signal Sc relative to the period of the drive signal Cf can be defined as desired, but in the present embodiment, the benchmark signal Sc rises once for every two times that the drive signal Cf intersects level 0 (in FIG. 7, for example, at points in time where the fluctuation waveform Mf1 of the focus position Pf1 reaches a positive peak).

(Controller)

The controller 9 is configured by a personal computer or the like that includes, for example, a central processing unit (CPU) and memory. The controller 9 achieves expected functionality by running predetermined software, and includes a lens settings portion 91 that defines settings of the lens controller 8, and a signal processor 92 that processes various input signals. Also, the controller 9 includes a memory 93 configured by a memory and the like.

The lens settings portion 91 defines, for example, settings for the frequency, amplitude, and maximum drive voltage of the drive signal Cf that is output by the lens controller 8. In the liquid lens apparatus 2, a number of changes in resonance may be changed according to a change in ambient temperature, for example. Therefore, the lens settings portion 91 executes operations to change the frequency of the drive signal Cf in real-time through feedback control and to stabilize the liquid lens apparatus 2.

Figure 6:
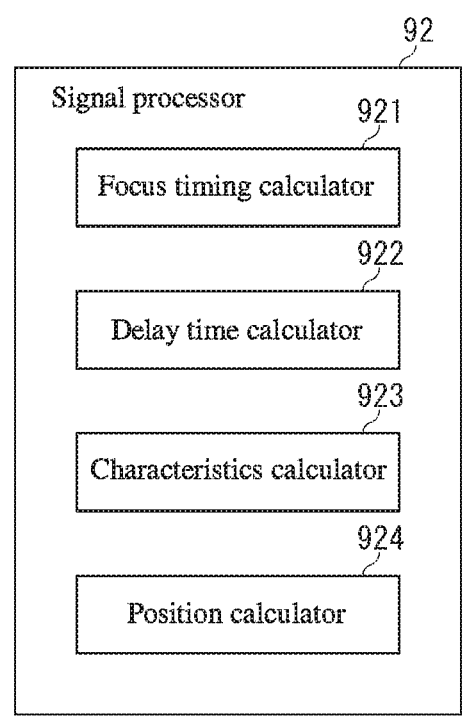
FIG. 6 is a block diagram schematically illustrating a signal processor according to the first embodiment.

In the signal processor 92, the photodetection signal Sm is input from the measurement light photodetector 34, the photodetection signal Sr is input from the reference light photodetector 56, and the benchmark signal Sc is input from the lens controller 8. The signal processor 92 calculates a measured object position Zcalc by performing processing based on the input photodetection signals Sm and Sr. Therefore, as illustrated in FIG. 6, the signal processor 92 carries out operations as a focus timing calculator 921, a delay time calculator 922, a characteristics calculator 923, and a position calculator 924.

A calibration table 94 that is prepared in advance using a target or the like is stored in the memory 93. Discussed in detail hereafter, the calibration table 94 associates the measured object position Zcalc, which is a computed value obtained by signal processing (computed value related to a position Pw of the measured object W on the optical axis OA1), with a measured object position Z, which serves as a display value for measurement results.

(Photodetection Signal)

Figure 7:
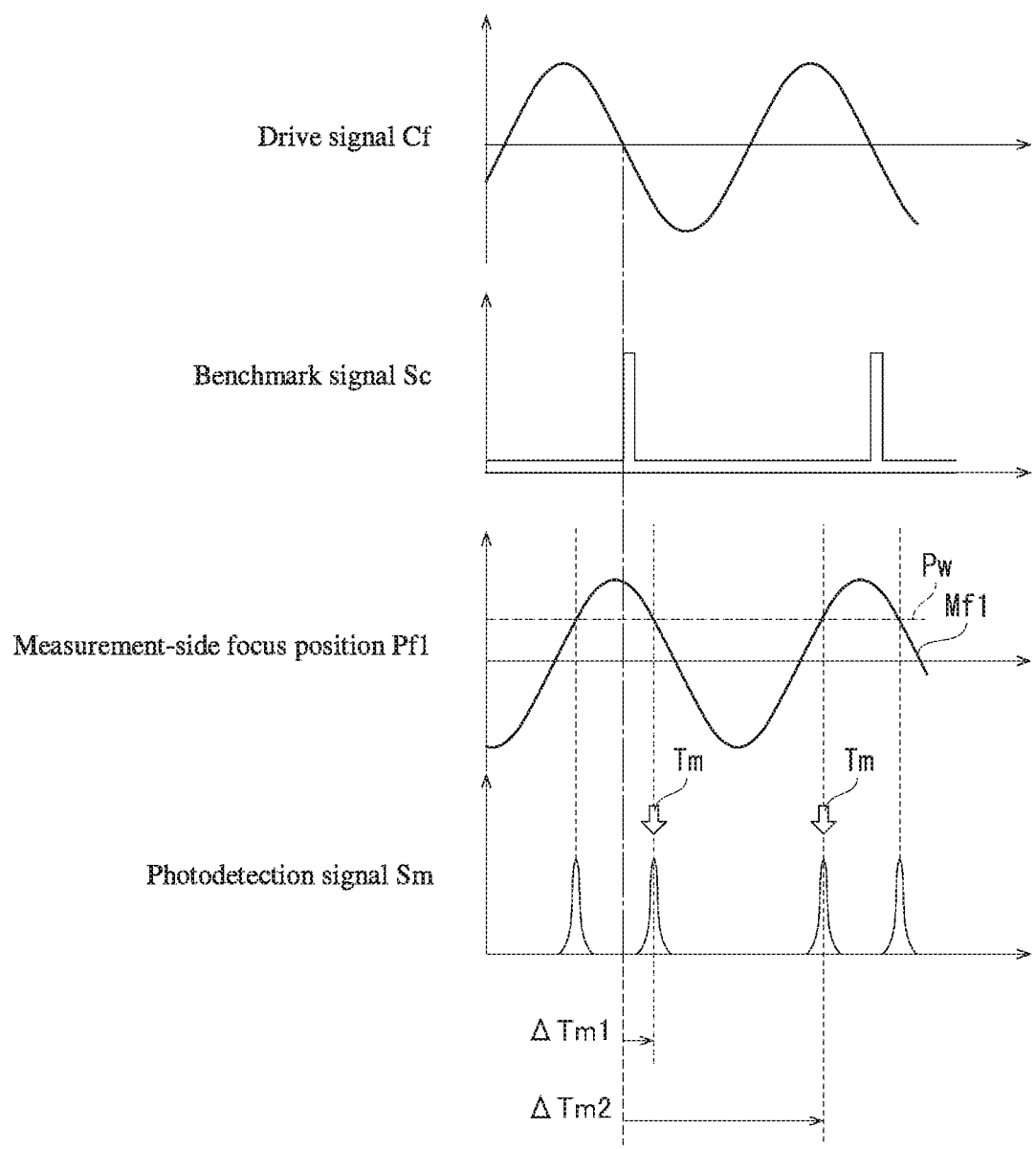
FIG. 7 provides graphs illustrating a drive signal, benchmark signal, measurement-side focus position, and measurement system photodetection signal according to the first embodiment.
Figure 8:
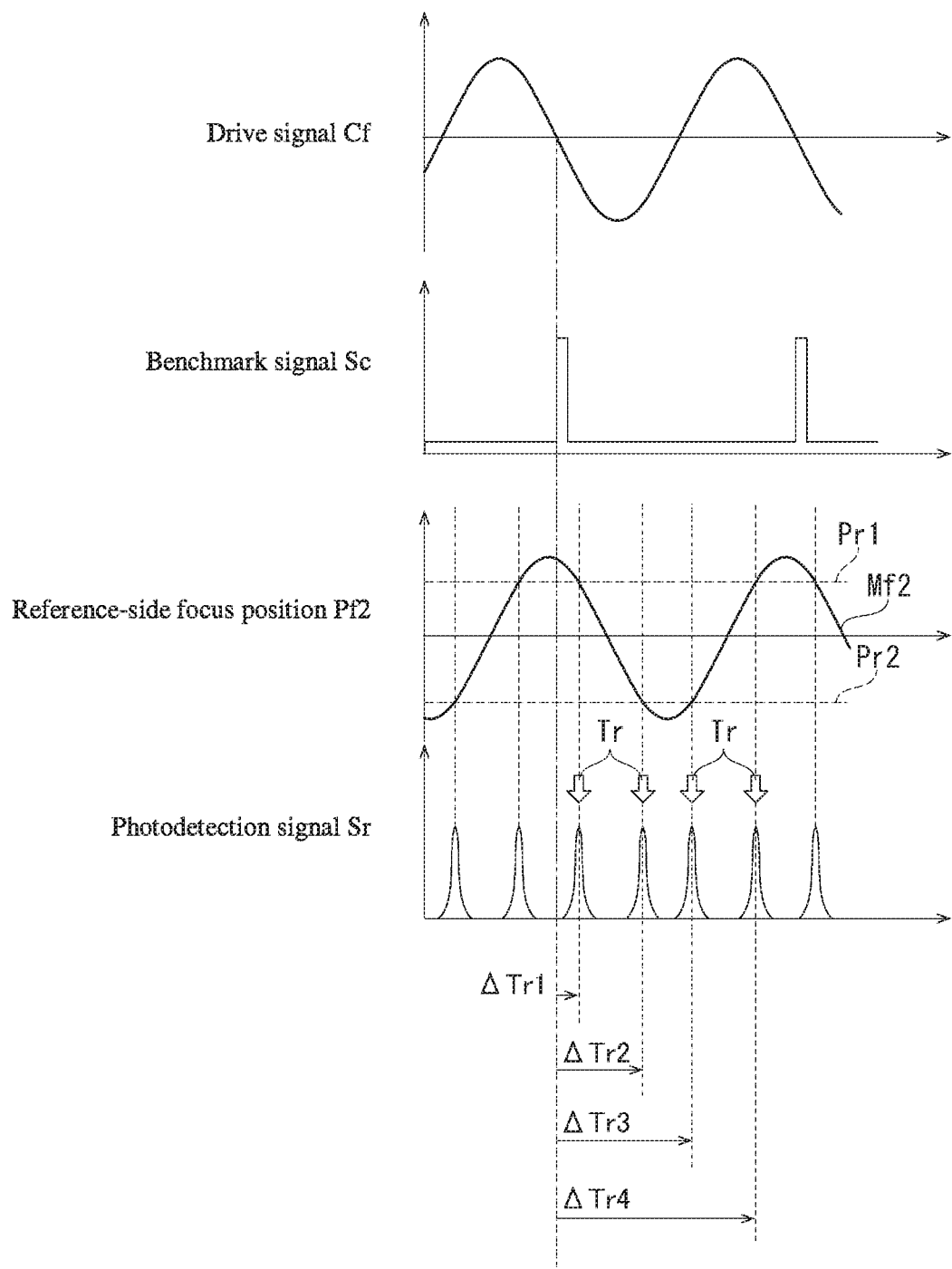
FIG. 8 provides graphs illustrating a drive signal, benchmark signal, reference-side focus position, and reference system photodetection signal according to the first embodiment.

As illustrated in FIGS. 7 and 8, when the sinusoidal drive signal Cf is input to the liquid lens apparatus 2, the apparatus is synchronized with the period of the drive signal Cf, and the benchmark signal Sc is output in a pulse. Furthermore, when the sinusoidal drive signal Cf is input to the liquid lens apparatus 2, by periodically changing the refractive index of the liquid lens apparatus 2, the focus positions Pf1 and Pf2 formed by the variable focal length lenses 101 and 102, respectively, are each changed periodically, synchronized with the drive signal Cf.

FIG. 7 illustrates an example of the position Pw of the measured object W on the optical axis OA1 for a measured object W located within the variable range of the focus position Pf1. The photodetection signal Sm exhibits a peak when the focus position Pf1 coincides with the position Pw of the measured object W, and exhibits two peaks per cycle of the drive signal Cf. In this example, an amount of time from the point in time when the benchmark signal Sc rises to each peak time of the first and second peaks of the photodetection signal Sm (measurement-side focus timing Tm) is expressed as a delay time $\Delta tm1$ and $\Delta tm2$. In the present embodiment, processing is performed using one value from the delay times $\Delta tm1$ and $\Delta tm2$ (for example, $\Delta tm1$), but in the modifications described hereafter, both of the delay times $\Delta tm1$ and $\Delta tm2$ may be used, as well.

FIG. 8 illustrates an example of positions Pr1 and Pr2 for the first reference surface 71s and the second reference surface 72s, respectively, located within the variable range of the focus position Pf2. The photodetection signal Sr exhibits a peak when the focus position Pf1 coincides with one of the positions Pr1 and Pr2 of the first reference surface 71s and the second reference surface 72s, respectively, and exhibits four peaks per cycle of the drive signal Cf. In this example, an amount of time from the point in time when the benchmark signal Sc rises to each peak time of the first through fourth peaks of the photodetection signal Sr is expressed as a delay time $\Delta tr1$, $\Delta tr2$, $\Delta tr3$, and $\Delta tr4$. The first and fourth peak times of the photodetection signal Sr are each equivalent to a reference-side focus timing Tr where the focus position Pf2 coincides with the first reference surface 71s (first reference-side focus timing). In addition, the second and third peak times of the photodetection signal Sr are each equivalent to a reference-side focus timing Tr where the focus position Pf2 coincides with the second reference surface 72s (second reference-side focus timing).

(Refractive Index Characteristics of Liquid Lens Apparatus)

The liquid lens apparatus 2 is influenced by the passage of time, changes in temperature, and the like, and accordingly the refractive index characteristics of the liquid lens apparatus 2 change, and the variable ranges VR1 and VR2, for example, of the focus positions Pf1 and Pf2 of the variable focal length lenses 101 and 102, respectively, change. In such a case, the fluctuation waveforms Mf1 and Mf2 of the focus positions Pf1 and Pf2 each change from an ideal waveform calculated from the drive signal Cf.

Figure 9:
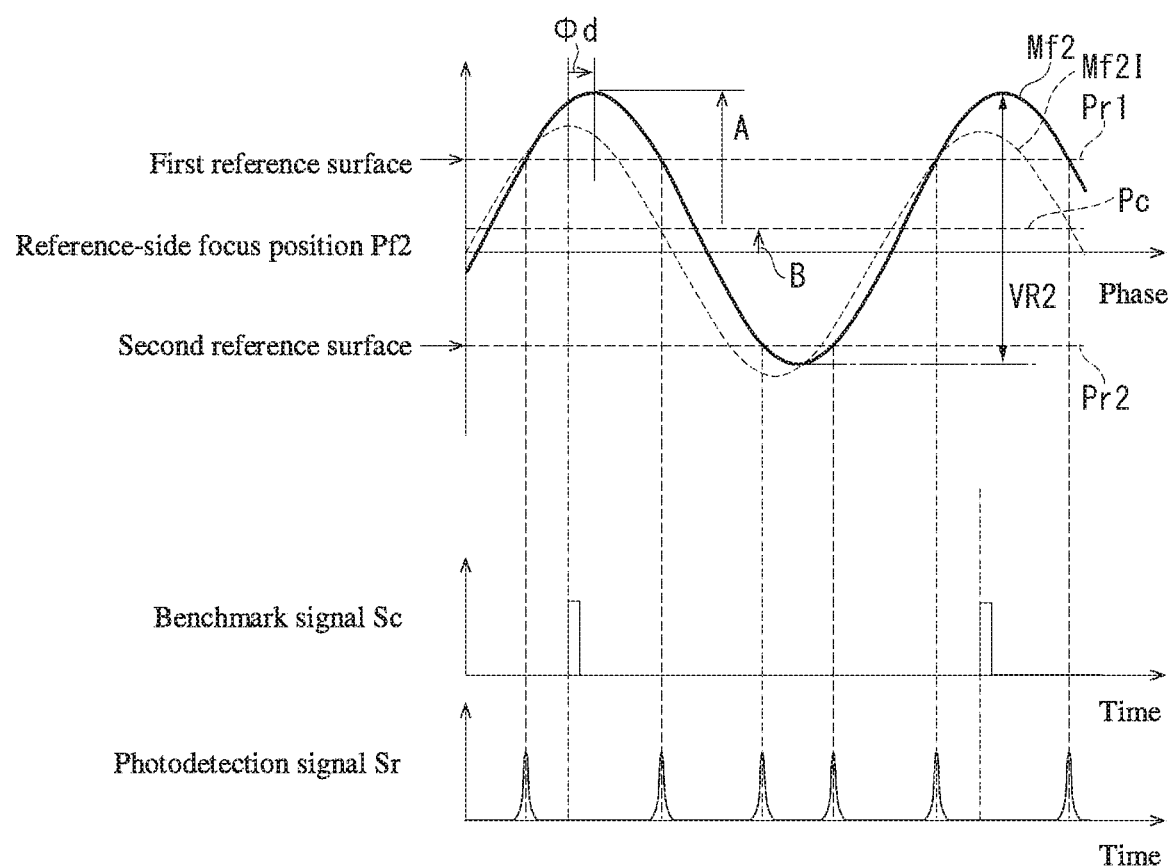
FIG. 9 provides graphs describing changes in refractive index characteristics of the liquid lens apparatus.

In FIG. 9, with respect to the focus position Pf2, an ideal fluctuation waveform Mf2I calculated from the drive signal Cf is illustrated with a dashed line and an actual fluctuation waveform Mf2 subsequent to the refractive index characteristics of the liquid lens apparatus 2 changing due to a change in temperature or the like is illustrated with a solid line. As illustrated in FIG. 9, the actual fluctuation waveform Mf2 has a phase delay $\Phi d$ and a deviation B relative to the ideal fluctuation waveform Mf2I. The deviation B is equivalent to an amount of offset of a center position Pc of the variable range VR2 of the focus position Pf2.

In the present embodiment, the refractive index characteristics of the liquid lens apparatus 2 are calculated as an amplitude A, the deviation B, and the phase delay $\Phi d$ of the fluctuation waveform Mf2 of the focus position Pf2. In this example, when using the delay times $\Delta tr1$, $\Delta tr2$, $\Delta tr3$, and $\Delta tr4$ of the photodetection signal Sr, the optical path length difference L between the first reference surface 71s and the second reference surface 72s relative to the reference-side objective lens 55, and a frequency $v$ of the drive signal Cf, the following equations (1) to (4) express the amplitude A, the deviation B, and the phase delay $\Phi d$ of the fluctuation waveform Mf2.

$$L/2 = B + A\cos(2\pi v \Delta tr1 + \Phi d) \quad \text{Equation (1)}$$

$$-L/2 = B + A\cos(2\pi v \Delta tr2 + \Phi d) \quad \text{Equation (2)}$$

$$-L/2 = B + A\cos(2\pi v \Delta tr3 + \Phi d) \quad \text{Equation (3)}$$

$$L/2 = B + A\cos(2\pi v \Delta tr4 + \Phi d) \quad \text{Equation (4)}$$

According to the above equations (1) to (4), the amplitude A, the deviation B, and the phase delay $\Phi d$ of the fluctuation waveform Mf2, which are unknown values, are respectively expressed by the following equations (5), (6), and (7) (or (8)).

$$A = L/\{\cos[\pi v(\Delta tr3 - \Delta tr2)] - \cos[\pi v(\Delta tr4 - \Delta tr1)]\} \quad \text{Equation (5)}$$

$$B = (L/2)\{\cos[\pi v(\Delta tr3 - \Delta tr2)] + \cos[\pi v(\Delta tr4 - \Delta tr1)]\}/\{\cos[\pi v(\Delta tr3 - \Delta tr2)] - \cos[\pi v(\Delta tr4 - \Delta tr1)]\} \quad \text{Equation (6)}$$

$$\Phi d = \pi[1 - v(\Delta tr1 + \Delta tr4)] \quad \text{Equation (7)}$$

$$\Phi d = \pi[1 - v(\Delta tr2 + \Delta tr3)] \quad \text{Equation (8)}$$

(Signal Processor)

Next, signal processing by the signal processor 92 during measurement operations of the non-contact displacement sensor 1 is described. After initiating the measurement operations of the non-contact displacement sensor 1, the signal processor 92 acquires the benchmark signal Sc and the photodetection signals Sm and Sr illustrated in FIGS. 7 and 8.

First, in the signal processor 92, the focus timing calculator 921 calculates the peak time of the photodetection signal Sm as the measurement-side focus timing Tm. Similarly, the focus timing calculator 921 calculates the peak time of the photodetection signal Sr as the reference-side focus timing Tr.

Next, the delay time calculator 922 calculates the delay times $\Delta tm1$ and $\Delta tm2$, which are the amount of time from the point in time when the benchmark signal Sc rises to the measurement-side focus timing Tm, and the delay times $\Delta tr1$, $\Delta tr2$, $\Delta tr3$, and $\Delta tr4$, which are the amount of time from the point in time when the benchmark signal Sc rises to the reference-side focus timing Tr. The delay time calculator 922 may also use a clock signal or the like.

Then, the characteristics calculator 923 uses the calculated delay times $\Delta tr1$, $\Delta tr2$, $\Delta tr3$, and $\Delta tr4$ for the reference-side focus timing Tr to calculate the amplitude A, the deviation B, and the phase delay $\Phi d$ of the fluctuation waveform Mf2 as refractive index characteristics of the liquid lens apparatus 2, based on equations (5), (6), and (7) (or (8)) above.

In addition, the position calculator 924 uses the calculated delay time $\Delta tm1$ of the measurement-side focus timing Tm to calculate a phase $\Phi mp1$ of the measurement-side focus timing Tm relative to the period of the drive signal Cf, based on the following equation (9).

$$\Phi mp1 = 2\pi v \Delta tm1 \qquad \text{Equation (9)}$$

After this, the position calculator 924 uses the calculated phase Φmp1 of the measurement-side focus timing Tm and the phase delay Φd to find a phase Φm1 of the measurement-side focus timing Tm that is corrected by the refractive index characteristics of the liquid lens apparatus 2, based on the following equation (10).

$$\Phi m1 = \Phi mp1 - \Phi d \qquad \text{Equation (10)}$$

Also, the position calculator 924 uses the amplitude A and the deviation B of the fluctuation waveform Mf2, a focal length Fr of the reference-side objective lens 55, and a focal length Fm of the measurement-side objective lens 33 to calculate the measured object position Zcalc, based on the following equation (11).

$$Zcalc = (Fm/Fr)(B + A \cos \Phi m1) \qquad \text{Equation (11)}$$

Then, by referencing the calibration table 94 as illustrated in FIG. 10, the position calculator 924 finds the measured object position Z that corresponds to the measured object position Zcalc calculated by equation (11) above. Specifically, the position calculator 924 calculates the measured object position Z that corresponds to the measured object position Zcalc using a linear squares method or the like, based on two measured object positions Zk having the measured object position Zcalc therebetween and measured object positions Zcalc,k that correspond to the measured object positions Zk.

With the signal processing of the signal processor 92 noted above, the non-contact displacement sensor 1 can calculate the measured object position Z, which is a value showing the position Pw of the measured object W on the optical axis OA1. The signal processor 92 may perform the above-noted processing every fixed amount of time, and the measured object position Z obtained may be successively stored in the memory 93.

(Calibration Table Preparation Method)

A method of preparing the calibration table 94 is now described. Prior to carrying out the displacement measurement described above, the calibration table 94 is prepared using the non-contact displacement sensor 1. First, a target is arranged instead of the measured object W, and the target is positioned in turn at a plurality of positions Zk (k=1 to n) in the optical axis direction with a high degree of accuracy using an interferometer or the like. In a state where the target is positioned, the measured object positions Zcalc,k are calculated by performing the above-described measurement with the non-contact displacement sensor 1. Then, the measured object positions Zk (value representing the positions Zk of the target that is positioned with a high degree of accuracy) and the measured object positions Zcalc,k (computed value) are associated with each other and are stored in the memory 93. The calibration table 94 illustrated in FIG. 10 is prepared in the above way.

The calibration table 94 is preferably prepared for each of a plurality of types of magnification power that are prepared as the measurement-side objective lens 33. During measurement, when switching between the magnification powers of the measurement-side objective lens 33, the embodiment is configured to switch between the calibration tables 94 being referenced.

Effects of the First Embodiment

In the present embodiment, the measurement-side variable focal length lens 101 is configured by the liquid lens apparatus 2 and the measurement-side objective lens 33. Therefore, the present embodiment does not require use of a lens drive mechanism and a scale that are required structures in a conventional laser displacement sensor. In addition, the measured object position Zcalc can be calculated using the photodetection signal Sm, and therefore, the processing of a large amount of data that is performed in a conventional chromatic point sensor is unnecessary. Moreover, in the present embodiment, the liquid lens apparatus 2 configuring the measurement-side variable focal length lens 101 also configures, together with the reference-side objective lens 55, the reference-side variable focal length lens 102, and the refractive index characteristics of the liquid lens apparatus 2 are calculated using the photodetection signal Sr for the reference light. Therefore, by performing correction in accordance with a change in the refractive index characteristics, changes in the measurement results due to the passage of time or environmental changes such as temperature can be inhibited (improved robustness). Accordingly, the present embodiment provides a non-contact displacement sensor 1 in which the configuration and processing can be simplified, and in which measurement accuracy is improved.

The non-contact displacement sensor 1 according to the present embodiment is further provided with the benchmark signal outputter 82 that outputs the benchmark signal Sc, which is synchronized to the drive signal Cf. The characteristics calculator 923 calculates the refractive index characteristics of the liquid lens apparatus 2 based on the delay times Δtr1 to Δtr4 of the reference-side focus timing Tr relative to the benchmark signal Sc. The position calculator 924 calculates the phase Φm1 of the measurement-side focus timing Tm relative to the period of the drive signal Cf based on the delay time Δtm1 of the measurement-side focus timing Tm relative to the benchmark signal Sc. Therefore, the refractive index characteristics of the liquid lens apparatus 2 and the phase Φm1 of the measurement-side focus timing Tm can be easily found even without performing complex computation.

In the present embodiment, the reference light optical path portion 7 is provided with the partial reflecting mirror 71 having the first reference surface 71s (first reference portion), which reflects a portion of the reference light, and the reflecting mirror 72 having the second reference surface 72s (second reference portion), which reflects the reference light that passes through the first reference surface 71s. In this configuration, by utilizing the partial reflecting mirror 71 and the reflecting mirror 72, the optical path length difference L between the first reference surface 71s and the second reference surface 72s can be easily set.

As light sources according to the present invention, the non-contact displacement sensor 1 according to the present embodiment is provided with the measurement light source 31 which emits measurement light and the reference light source 51 which emits reference light, and as photodetectors according to the present invention, the non-contact displacement sensor 1 is provided with the measurement light photodetector 34 and the reference light photodetector 56. Therefore, the photodetection signals Sm and Sr can be readily distinguished, and thus computation in the signal processor 92 is simplified.

The non-contact displacement sensor 1 according to the present embodiment is capable of switching between magnification powers of the measurement-side objective lens 33, which is difficult in the conventional technology. Specifically, in the conventional technology, a laser displacement sensor has an objective lens incorporated into a lens drive mechanism, and a chromatic point sensor has an objective lens modularized along with a special lens group that disperses white light using axial chromatic aberration. Therefore, in the laser displacement sensor and the chromatic point sensor, it is difficult to swap out only the objective lens for a separate one having a different magnification power, and a separate device must be prepared in order to make measurements in a different measurement range and resolution. Conversely, in the non-contact displacement sensor 1 according to the present embodiment, there is no need to integrate the measurement-side objective lens 33 with other structures, as in the prior art. Therefore, a configuration can be easily provided which is capable of switching the measurement-side objective lens 33 for a separate measurement-side objective lens 33 having a different magnification power.

In the present embodiment, a confocal optical system is configured in both the measurement system 3 and the reference system 5 in order to detect the measurement-side focus timing Tm and the reference-side focus timing Tr. Therefore, compared to cases using other focal point detection methods, the measurement accuracy can be further improved since the present embodiment is less likely to be affected by the inclination of the surface of the measured object W, measurement accuracy for surface characteristics such as roughness, and so on. Also, by utilizing the optical fibers 43 and 63, the light sources (measurement light source 31 and reference light source 51) and the photodetectors (measurement light photodetector 34 and reference light photodetector 56), which are sources of heat, can be placed away from a portion that serves as a measurement head, and thermal effects on the measurement can be reduced. Further, the end face 43e of the optical fiber 43 and the end face 63e of the optical fiber 63 each play both roles as a point light source and a pinhole for detection in the confocal optical system, and therefore, the number of adjustment steps during manufacturing can be significantly reduced.

Modifications of the First Embodiment

In the first embodiment described above, the phase $\Phi m1$ of the measurement-side focus timing Tm is calculated by performing the calculations of equations (9) and (10), given above, using the delay time $\Delta tm1$ of the measurement-side focus timing Tm, but the present invention is not limited to this. For example, a phase $\Phi m2$ of the measurement-side focus timing Tm may also be calculated by performing calculations similar to equations (9) and (10), given above, using the delay time $\Delta tm2$ of the measurement-side focus timing Tm.

Alternatively, equations (9) and (10) according to the first embodiment may be omitted and the phase $\Phi m1$ of the measurement-side focus timing Tm may also be calculated by performing a calculation according to equation (12), given below, using the delay times $\Delta tm1$ and $\Delta tm2$ of the measurement-side focus timing Tm. In equation (12), $\nu$ is the frequency of the drive signal Cf.

$$\Phi m1 = \pi[1 - \nu(\Delta tm2 - \Delta tm1)] \quad \text{Equation (12)}$$

According to this method, the computation step in the first embodiment can be partially omitted, and therefore measurement can be accelerated due to shortening the computation time. Also, in equation (12), "$\Delta tm2 - \Delta tm1$" is equivalent to the time difference between the two measurement-side focus timings Tm that appear during one cycle of the drive signal Cf. Therefore, instead of measuring the delay times $\Delta tm1$ and $\Delta tm2$ of the measurement-side focus timing Tm, the time difference may be measured directly.

In the first embodiment, for the delay times $\Delta tm1$ and $\Delta tm2$ of the measurement-side focus timing Tm relative to the benchmark signal Sc, measurement begins from the point in time when the benchmark signal Sc rises, but measurement may also begin from the point in time when the benchmark signal Sc falls. The same may apply to the delay times $\Delta tr1$ to $\Delta tr4$ of the reference-side focus timing Tr, as well.

In the first embodiment, the amplitude A, the deviation B, and the phase delay $\Phi d$ of the fluctuation waveform Mf2 of the focus position Pf2 are calculated based on the delay times $\Delta tr1$ to $\Delta tr4$ of the reference-side focus timing Tr, but the present invention is not limited to this and these values may also be found by computation or the like based on the sine wave exhibited by the drive signal Cf. Similarly, the phase $\Phi m1$ of the measurement-side focus timing Tm is calculated based on the delay times $\Delta tm1$ and $\Delta tm2$ of the measurement-side focus timing Tm, but the present invention is not limited to this and this value may also be found by computation or the like based on the sine wave exhibited by the drive signal Cf.

Second Embodiment

Figure 11:
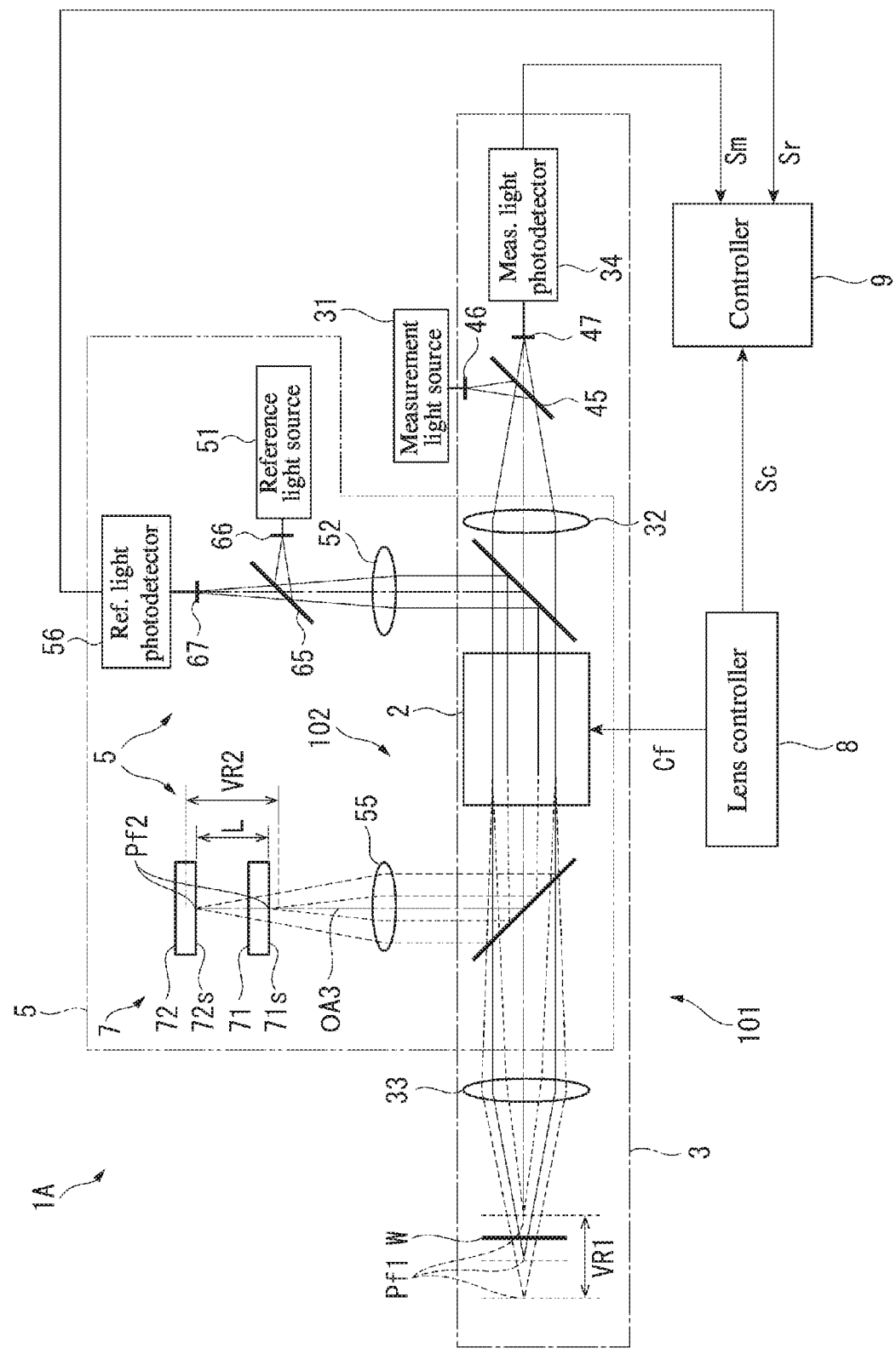
FIG. 11 is a schematic view illustrating a non-contact displacement sensor according to a second embodiment of the present invention.

A non-contact displacement sensor 1A according to a second embodiment is described with reference to FIG. 11. In the second embodiment; identical reference numerals are used for structures similar to those in the first embodiment and a detailed description thereof is omitted. As illustrated in FIG. 11, in the non-contact displacement sensor 1A, a pinhole-type confocal optical system is configured in each of the measurement system 3 and the reference system 5. Specifically, the non-contact displacement sensor 1A is provided with a beam splitter 45 and pinhole members 46 and 47 instead of the optical guide 4 according to the first embodiment. Also, the non-contact displacement sensor 1A is provided with a beam splitter 65 and pinhole members 66 and 67 instead of the optical guide 6 according to the first embodiment.

In the measurement system 3, the beam splitter 45 is configured so as to bend the measurement light emitted from the measurement light source 31 toward the collimating lens 32, and so as to allow light that is incident from the collimating lens 32 side to pass through to the measurement light photodetector 34 side. The pinhole member 46 is arranged between the beam splitter 45 and the measurement light source 31. Due to the measurement light source 31 emitting the measurement light via the pinhole of the pinhole member 46, the pinhole serves as a point light source. The pinhole member 47 is arranged between the beam splitter 45 and the measurement light photodetector 34 and has a pinhole that is arranged at the focal point on the rear side of the collimating lens 32. The measurement light that is focused at and reflected by the surface of the measured object W passes through the pinhole of the pinhole member 47, and then is incident on the measurement light photodetector 34.

In the reference system 5, the beam splitter 65 is configured so as to bend the measurement light emitted from the reference light source 51 toward the collimating lens 52, and so as to allow light that is incident from the collimating lens 52 side to pass through to the reference light photodetector 56 side. The pinhole member 66 is arranged between the beam splitter 65 and the reference light source 51. Due to the reference light source 51 emitting the reference light via the pinhole of the pinhole member 66, the pinhole serves as a point light source. The pinhole member 67 is arranged between the beam splitter 65 and the reference light photodetector 56 and has a pinhole that is arranged at the focal point on the rear side of the collimating lens 52. The reference light that is focused at and reflected by the surface of the measured object W passes through the pinhole of the pinhole member 67, and then is incident on the reference light photodetector 56.

According to such a non-contact displacement sensor 1A, similarly to the first embodiment, the configuration and processing can be simplified, and measurement accuracy can be improved. Also, according to the non-contact displacement sensor 1A, the optical fibers 42 to 44 and 62 to 64 of the first embodiment are omitted, and therefore there is no need to provide room to run these optical fibers and the non-contact displacement sensor 1A overall can be made more compact.

Third Embodiment

A non-contact displacement sensor 1B according to a third embodiment is described with reference to FIG. 12. In the third embodiment, identical reference numerals are used for structures similar to those in the first embodiment and a detailed description thereof is omitted.

Figure 12:
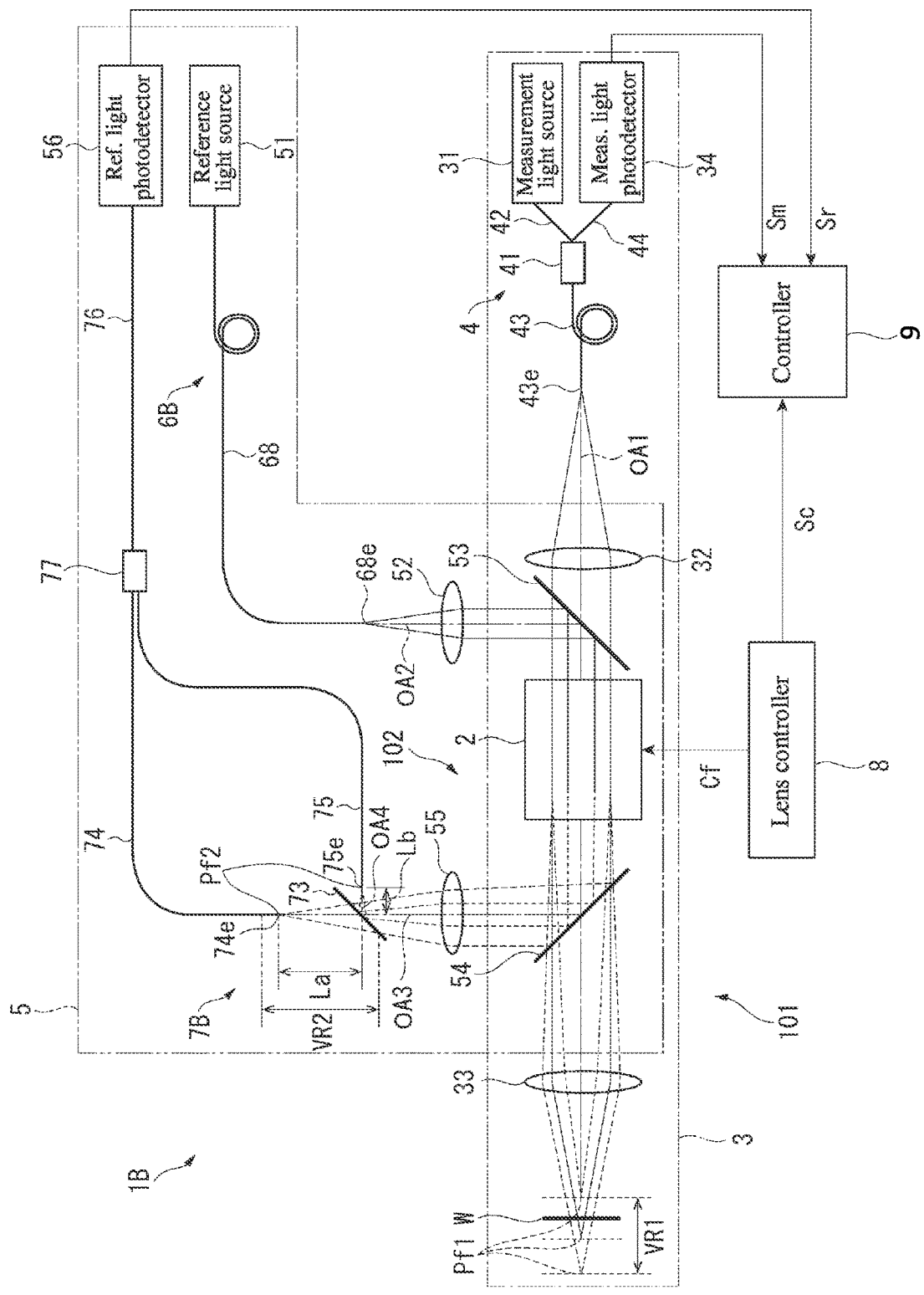
FIG. 12 is a schematic view illustrating a non-contact displacement sensor according to a third embodiment of the present invention.

As illustrated in FIG. 12, instead of the reference light optical path portion 7 according to the first embodiment, the non-contact displacement sensor 1B is provided with a reference light optical path portion 7B having a different configuration from that of the reference light optical path portion 7. Specifically, the reference light optical path portion 7B is provided with a reference light optical path splitter 73 that splits the reference light, an optical fiber 74 (first optical fiber) that is arranged further along in a direction traveled by a first reference light split by the reference light optical path splitter 73, and an optical fiber 75 (second optical fiber) that is arranged further along in a direction traveled by a second reference light split by the reference light optical path splitter 73.

The reference light optical path splitter 73 is a beam splitter such as a half mirror, for example. The reference light that transits through the reference-side objective lens 55 is split into the first reference light, which transits through the reference light optical path splitter 73, and the second reference light, which is reflected by the reference light optical path splitter 73. In other words, the reference light optical path splitter 73 is arranged on the optical axis OA3 and forms an optical axis OA4 that branches off from the optical axis OA3.

A first reference end face 74e (first reference portion), which is an end face of a first end portion of the optical fiber 74, is arranged on the optical axis OA3. In turn, a second reference end face 75e (second reference portion), which is an end face of a first end portion of the optical fiber 75, is arranged on the optical axis OA4. The position of each of the first reference end face 74e and the second reference end face 75e can be set as desired, so long as the position is within a variable range of the focus position Pf2 formed by the reference-side variable focal length lens 102. In the present embodiment, a known value is defined for the optical path length difference L, which is the difference between the optical path length running from the reference-side objective lens 55 to the first reference surface 74e and the optical path length running from the reference-side objective lens 55 to the second reference surface 75e. The optical path length difference L is a length obtained by taking the difference between a distance La on the optical axis OA3 from the reference light optical path splitter 73 to the first reference end face 74e of the optical fiber 74 and a distance Lb on the optical axis OA4 from the reference light optical path splitter 73 to the second reference end face 75e of the optical fiber 75.

Also, the reference light optical path portion 7B is further provided with an optical fiber 76, the first end portion of which is connected to the reference light photodetector 56, and a fiber splitter 77, to which is connected the second end portion of each of the optical fibers 74 to 76. The fiber splitter 77 is configured such that the light that is incident from each of the optical fibers 74 and 75 is guided to the optical fiber 76.

The reference light incident on the reference light optical path portion 7B is split into the first reference light, which transits through the reference light optical path splitter 73, and the second reference light, which is reflected by the reference light optical path splitter 73. After splitting, the first reference light advances toward the first reference end face 74e of the optical fiber 74 and the second reference light advances toward the second reference end face 75e of the optical fiber 75. In this example, the focus position Pf2 formed by the reference-side variable focal length lens 102 periodically changes along each of the optical axis OA3 and the optical axis OA4. Therefore, when the focus position Pf2 coincides with the first reference end face 74e, the first reference light that has been collected is incident on the first reference end face 74e, and via the optical fibers 74 and 76 is incident on the reference light photodetector 56. In turn, when the focus position Pf2 coincides with the second reference end face 75e, the second reference light that has been collected is incident on the second reference end face 75e, and via the optical fibers 75 and 76 is incident on the reference light photodetector 56. Accordingly, the reference light incident on the reference light photodetector 56 is maximized when the focus position Pf2 coincides with either the first reference end face 74e or the second reference end face 75e. That is, the photodetection signal Sm output from the reference light photodetector 56 exhibits a peak when the focus position Pf2 coincides with either the first reference end face 74e or the second reference end face 75e.

Also, instead of the optical guide 6 according to the first embodiment, the non-contact displacement sensor 1B is provided with an optical guide 6B having a different configuration from that of the optical guide 6. Specifically, the optical guide 6B has an optical fiber 68, a first end portion of which is connected to the reference light source 51. The reference light emitted from the reference light source 51 transits through the optical fiber 68, and is emitted from an end face 68e of a second end portion of the optical fiber 68. That is, the end face 68e of the optical fiber 68 carries out operations as a point light source of reference light. The end face 68e of the optical fiber 68 can be arranged at any desired position on the optical axis OA2 because the end face 68e does not receive any reference light.

According to such a non-contact displacement sensor 1B, similarly to the first embodiment, the configuration and processing can be simplified, and measurement accuracy can be improved. Also, according to the non-contact displacement sensor 1B, the partial reflecting mirror 71 and the reflecting mirror 72 according to the first embodiment can be omitted, and therefore costs can be lowered by reducing the number of optical components.

Modifications of the Third Embodiment

Instead of the optical fibers 74 and 75, the reference light optical path portion 7B according to the third embodiment may also be provided with a pinhole member arranged on each of the optical axes OA3 and OA4 and a reference light photodetector arranged on the rear side of each of the pinhole members. In such a case, the pinhole of each pinhole member is equivalent to, respectively, the first reference portion and the second reference portion according to the present invention. In addition, the optical guides 4 and 6B may be swapped out for a configuration utilizing a pinhole member, similar to the second embodiment.

In the third embodiment, when the beam splitter 54 splits the light emitted from the measurement light source 31 into measurement light and reference light, the reference light source 51, the optical guide 6B, the collimating lens 52, and the beam splitter 53 may also be omitted.

Fourth Embodiment

Figure 13:
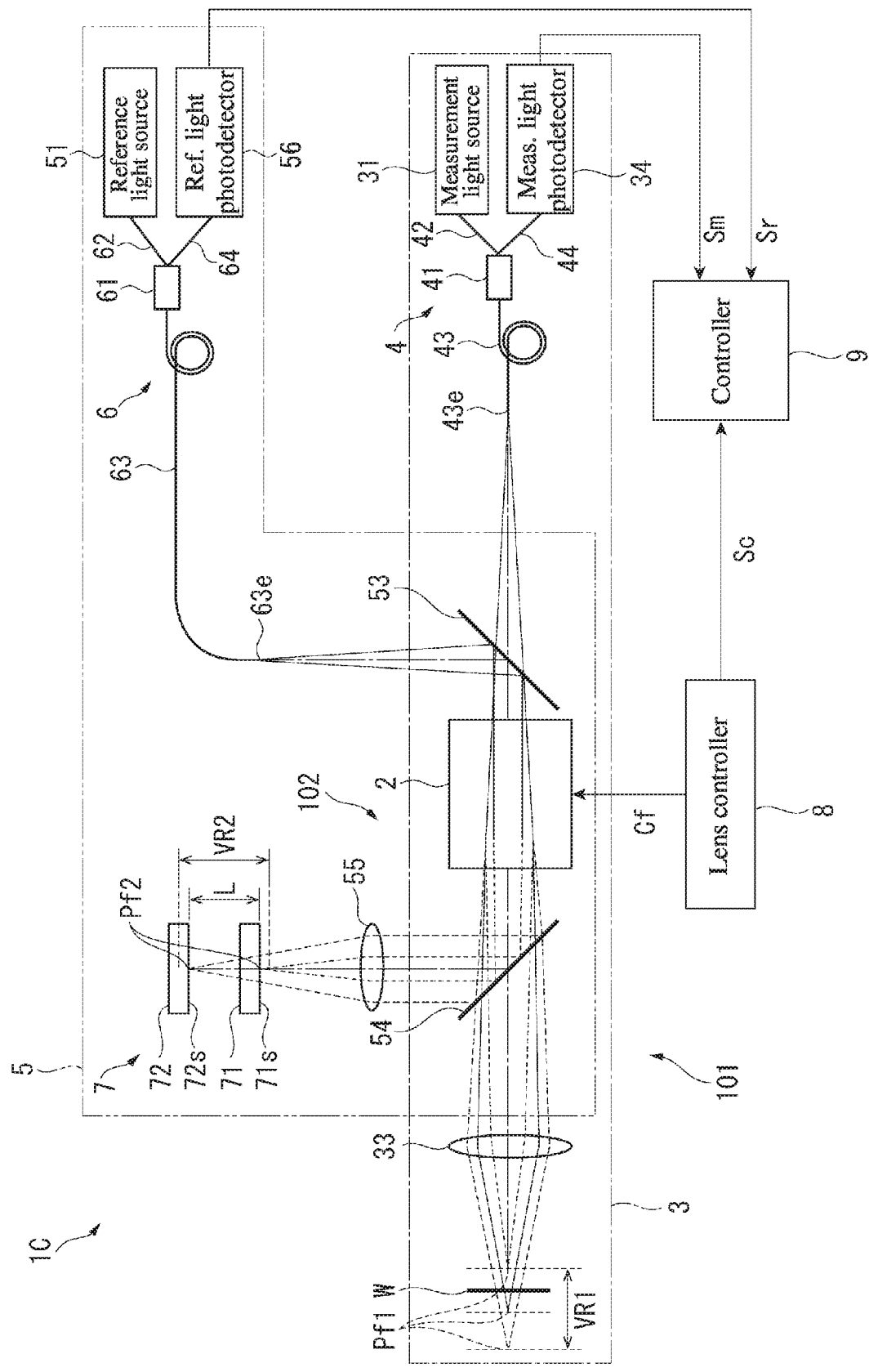
FIG. 13 is a schematic view illustrating a non-contact displacement sensor according to a fourth embodiment of the present invention.

A non-contact displacement sensor 1C according to a fourth embodiment is described with reference to FIG. 13. In the fourth embodiment, identical reference numerals are used for structures similar to those in the first embodiment and a detailed description thereof is omitted. As illustrated in FIG. 13, in the non-contact displacement sensor 1C, the collimating lenses 32 and 52 are omitted in the measurement system 3 and the reference system 5, respectively, and a finite correction optical system is configured. In the measurement system 3 configured in this way, the measurement light reflected by the measured object W is imaged by the measurement-side objective lens 33. Furthermore, the end face 43e of the optical fiber 43 is not positioned at the focal point on the rear side of the collimating lens 32 as in the first embodiment, but instead is arranged to the rear of a focal point on the rear side of the measurement-side objective lens 33, at a position separated by a distance obtained by multiplying the imaging magnification power by the focal distance of the measurement-side objective lens 33. Meanwhile, in the reference system 5, the reference light that is reflected by either one of the first reference surface 71s and the second reference surface 72s is imaged by the reference-side objective lens 55. Also, the end face 63e of the optical fiber 63 is not positioned at the focal point on the rear side of the collimating lens 52 as in the first embodiment, but instead is arranged to the rear of a focal point on the rear side of the reference-side objective lens 55, at a position separated by a distance obtained by multiplying the imaging magnification power by the focal distance of the reference-side objective lens 55.

According to such a non-contact displacement sensor 1C, similarly to the first embodiment, the configuration and processing can be simplified, and measurement accuracy can be improved. In addition, in the non-contact displacement sensor 1C, cost reduction can be achieved by omitting the collimating lenses 32 and 52 of the first embodiment.

Modifications of the Fourth Embodiment

In the fourth embodiment, the finite correction optical system is configured for each of the measurement system 3 and the reference system 5, but a finite correction optical system may also be configured in only one, while an infinite correction optical system (which includes the collimating lens 32 or 52) such as in the first embodiment is configured in the other.

Fifth Embodiment

Figure 14:
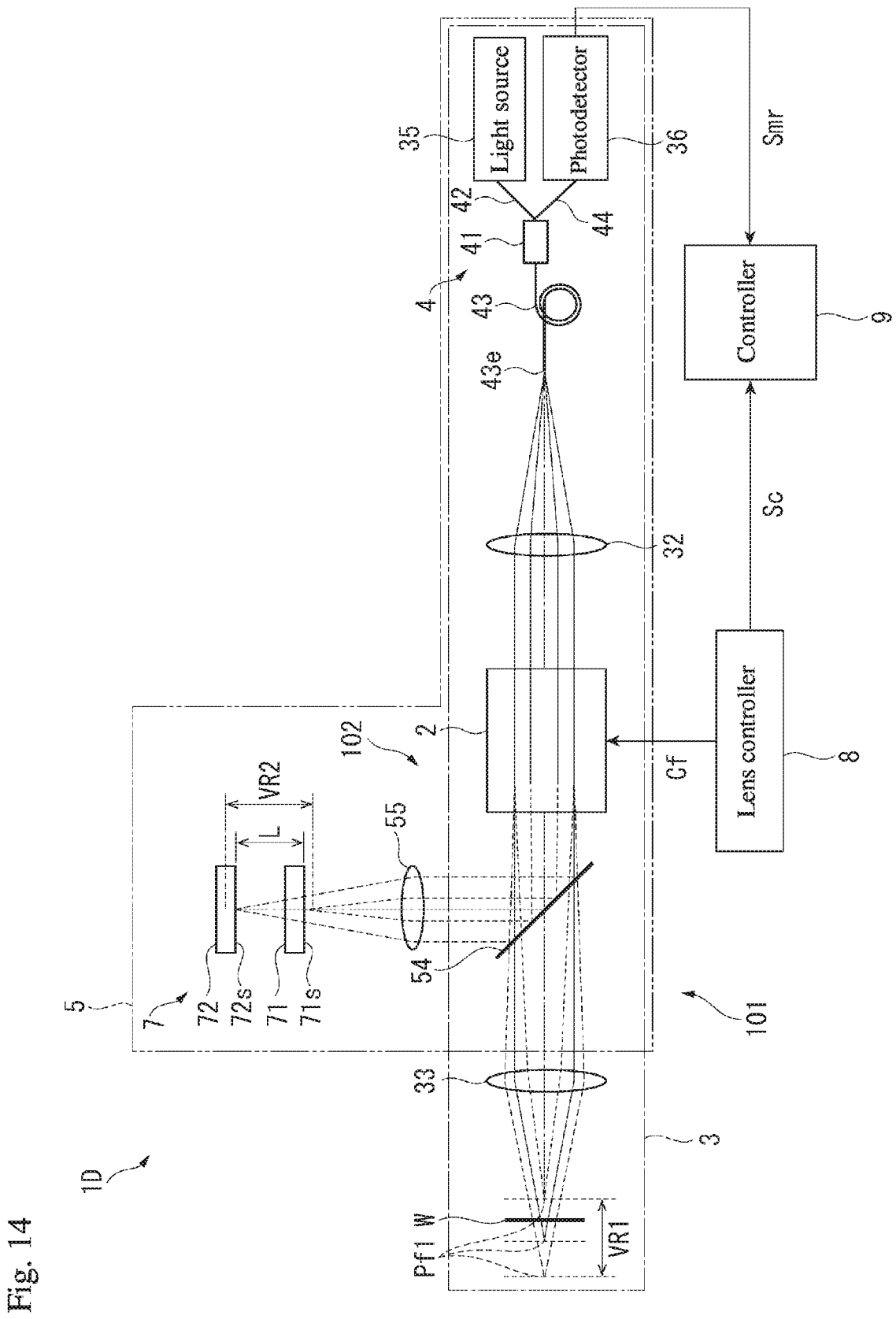
FIG. 14 is a schematic view illustrating a non-contact displacement sensor according to a fifth embodiment of the present invention.

A non-contact displacement sensor 1D according to a fifth embodiment is described with reference to FIG. 14. In the fifth embodiment, identical reference numerals are used for structures similar to those in the first embodiment and a detailed description thereof is omitted. As illustrated in FIG. 14, in the non-contact displacement sensor 1D, a light source 35 and a photodetector 36 are shared by the measurement system 3 and the reference system 5. Specifically, in the non-contact displacement sensor 1D, the reference light source 51, the collimating lens 52, the beam splitter 53, the reference light photodetector 56, and the optical guide 6 of the first embodiment are omitted. Also, the measurement light source 31 and the measurement light photodetector 34 according to the first embodiment are configured as the light source 35 and the photodetector 36 that are shared by the measurement system 3 and the reference system 5.

In such a configuration, the light emitted from the light source 35 transits the optical guide 4, and is emitted from the end face 43e of the optical fiber 43. The light is collimated by the collimating lens 32, after which the light transits through the liquid lens apparatus 2 and is split by the beam splitter 54 into measurement light and reference light. Similar to the first embodiment, the measurement light that passes through the beam splitter 54 is emitted at the measured object W, and after traveling the reverse path, the measurement light is collected by the collimating lens 32. In this example, the measurement light that is reflected by the measured object W when the focus position Pf1 coincides with the surface of the measured object W is incident on the end face 43e of the optical fiber 43, and via the optical guide 4 is incident on the photodetector 36. Meanwhile, similarly to the first embodiment, the reference light that is reflected by the beam splitter 54 is incident on the reference light optical path portion 7. Then, the reference light that is reflected by the first reference surface 71s or the second reference surface 72s follows the reverse path, and then is collected by the collimating lens 32. In this example, when the focus position Pf2 coincides with the reference surface of either the first reference surface 71s or the second reference surface 72s, the reference light that is reflected by the corresponding reference surface is incident on the end face 43e of the optical fiber 43, and via the optical guide 4 is incident on the photodetector 36. Accordingly, a photodetection signal Smr output from the photodetector 36 exhibits a peak when the focus position Pf1 coincides with the surface of the measured object W, and when the focus position Pf1 coincides with either the first reference surface 71s or the second reference surface 72s.

Figure 15:
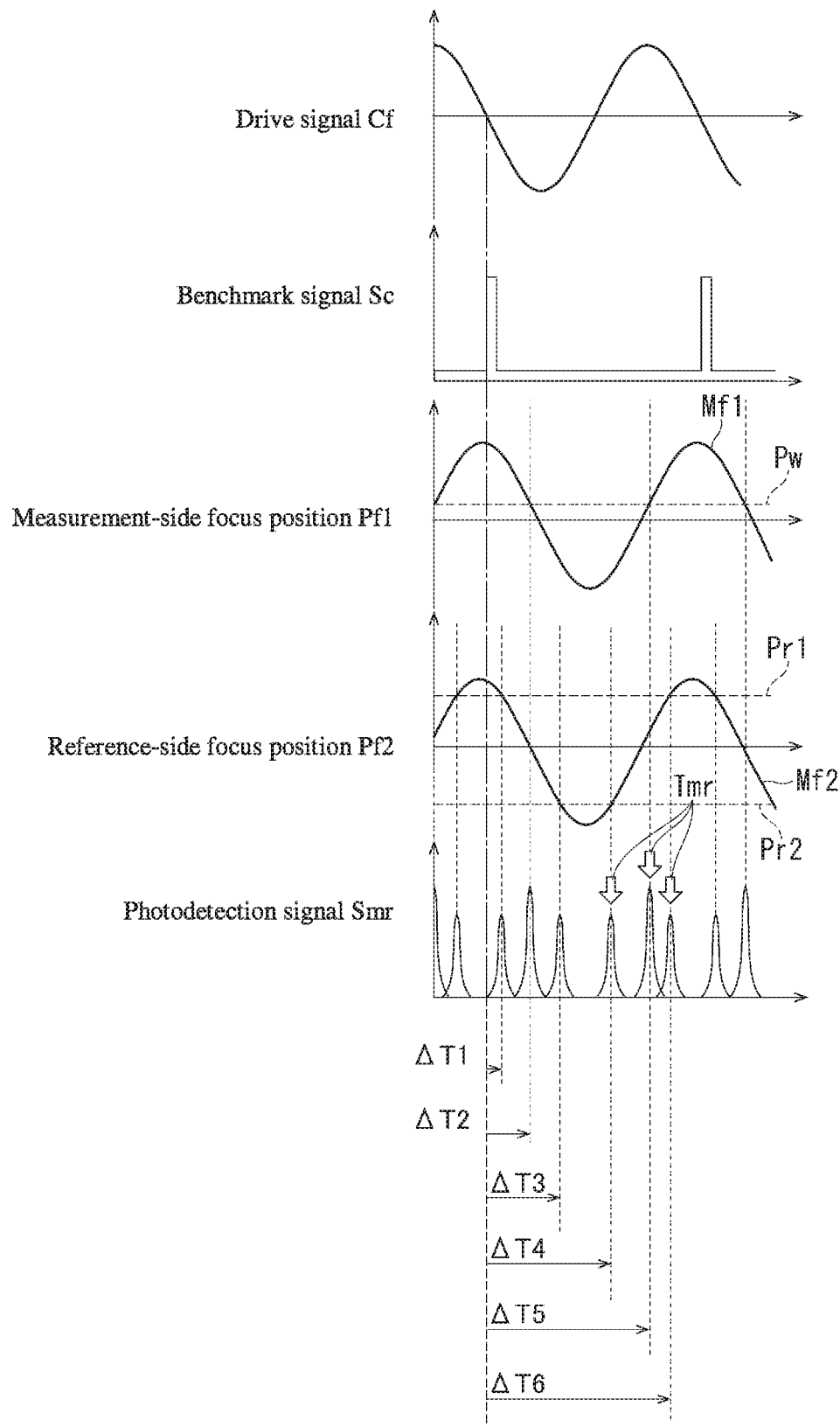
FIG. 15 provides graphs illustrating a drive signal, benchmark signal, focus positions, and photodetection signal according to the fifth embodiment.

As illustrated in FIG. 15, the photodetection signal Smr is a signal in which the photodetection signals Sm and Sr according to the first embodiment are mixed together. Based on the photodetection signal Smr output from the photodetector 36, the focus timing calculator 921 finds the peak time of the photodetection signal Smr as a focus timing Tmr. Based on the calculated focus timing Tmr and the benchmark signal Sc, the delay time calculator 922 calculates delay times $\Delta t1$ to $\Delta t6$ of the focus timing Tmr. The delay time calculator 922 may also use a clock signal or the like.

In this example, the plurality of focus timings Tmr that exist within one cycle of the drive signal Cf include both the measurement-side focus timing Tm and the reference-side focus timing Tr according to the first embodiment. That is, the delay times $\Delta t1$ to $\Delta t6$ each correspond to one of the delay times $\Delta tm1$, $\Delta tm2$, $\Delta tr1$, $\Delta tr2$, $\Delta tr3$, and $\Delta tr4$ according to the first embodiment.

Given this, in the fifth embodiment, the first reference surface 71s and the second reference surface 72s are arranged near boundaries on both sides of the variable range VR2 of the focus position Pf2 formed by the reference-side variable focal length lens 102. Accordingly, each peak in the photodetection signal Smr caused by the measurement light (measurement-side focus timing) is output so as to occur between peaks in the photodetection signal Smr caused by the reference light (reference-side focus timing). Thus, based on the order of the focus timing Tmr during a single cycle of the drive signal Cf, the characteristics calculator 923 and the position calculator 924 handle the delay times Δtm1, Δtm2, Δtr1, Δtr2, Δtr3, and Δtr4 according to the first embodiment by substituting the corresponding delay times Δt1 to Δt6. The correspondence relationship between the delay times Δtm1, Δtm2, Δtr1, Δtr2, Δtr3, and Δtr4 according to the first embodiment and the delay times Δt1 to Δt6 illustrated in FIG. 15 is as noted below, but may also be modified in accordance with the phase of the benchmark signal Sc.

Δtm1→Δt2
Δtm2→Δt5
Δtr1→Δt1
Δtr2→Δt3
Δtr3→Δt4
Δtr4→Δt6

According to such a non-contact displacement sensor 1D, similarly to the first embodiment, the configuration and processing can be simplified, and measurement accuracy can be improved. Also, according to the non-contact displacement sensor 1D, the light source 35 and the photodetector 36 are shared in the measurement system 3 and the reference system 5, and therefore significant reductions in cost can be achieved.

Modifications

The present invention is not limited to the various embodiments described above, and includes modifications and improvements within a scope capable of achieving the advantages of the present invention. For example, the configurations in each of the embodiments described above may be combined with the configurations of another embodiment.

In each of the embodiments described above, the drive signal Cf and the fluctuation waveforms Mf1 and Mf2 are sine waves. However, the drive signal Cf and the fluctuation waveforms Mf1 and Mf2 may instead be triangular waves, saw-tooth waves, rectangular waves, or some other waveform. The specific configuration of the liquid lens apparatus 2 may be modified as appropriate. Instead of having a hollow cylindrical shape, the case 21 and the oscillating member 22 may have a hollow hexagonal shape, for example. The dimensions of these components and the properties of the liquid 25 can also be selected as appropriate for the application.

In each of the embodiments described above, the lens controller 8 includes the benchmark signal outputter 82, but the controller 9 may also include a benchmark signal outputter. Alternatively, the benchmark signal outputter may be configured separately from the lens controller 8 and the controller 9. Moreover, the lens controller 8 and the controller 9 may be configured as an integrated control device.

Also, in each of the embodiments described above, the non-contact displacement sensors 1 and 1A to 1D find the various focus timings Tm, Tr, and Tmr by configuring an optical system that uses a confocal method in each of the measurement system 3 and the reference system 5, but the present invention is not limited to this. Specifically, the non-contact displacement sensors 1 and 1A to 1D can find the various focus timings Tm, Tr, and Tmr by using various other focal point detection methods such as a double pinhole method, an astigmatic method, and a knife edge method. For example, when the non-contact displacement sensors 1 and 1A to 1D configure an optical system using a double pinhole format in the measurement system 3, a photodetector is respectively provided before and after a condensing position that forms a conjugate relationship to the focus position Pf1, and computation is performed based on the photodetection signal output from each photodetector, whereby the measurement-side focus timing Tm can be found. The same also applies to the reference system 5 in a case where the reference-side focus timing Tr is found. In the confocal method, peak positions of the photodetection signals Sm, Sr, and Smr must be detected in order to find the respective focus timings Tm, Tr, and Tmr. The computation for this detection is complicated, and compared to the confocal method, the computation required to find the various focus timings Tm, Tr, and Tmr is simple in the double pinhole method, the astigmatic method, and the knife edge method. Therefore, by adopting these methods, the computation time may be decreased and measurement may be accelerated.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A non-contact displacement sensor comprising:
a light source which emits light;
a liquid lens in which a refractive index periodically changes in response to an input drive signal;
a beam splitter that splits light, which is emitted from the light source and passes through the liquid lens, into measurement light and reference light;
a measurement-side objective lens that emits the measurement light split by the beam splitter at a measurable object;
a reference-side objective lens on which the reference light split by the beam splitter is incident;
a reference light optical system which includes a first reference surface and a second reference surface each having a mutually distinct optical path length measured from the reference-side objective lens, and in which the reference light that passes through the reference-side objective lens is incident on each of the first reference surface and the second reference surface;
a photodetector which receives the measurement light reflected by the measurable object and receives the reference light that has traveled by way of the reference light optical system, and outputs a photodetection signal;
a signal processor which operates as:
a focus timing calculator which, based on the photodetection signal, calculates:

a measurement-side focus timing at which the measurement light is focused on the surface of the measurable object, a first reference-side focus timing at which the reference light is focused on the first reference surface, and a second reference-side focus timing at which the reference light is focused on the second reference surface;

a characteristics calculator that calculates the refractive index characteristics of the liquid lens based on the first reference-side focus timing, the second reference-side focus timing, and an optical path length difference, which is a difference between an optical path length running from the reference-side objective lens to the first reference surface and the optical path length running from the reference-side objective lens to the second reference surface; and a position calculator that calculates a position of the measurable object based on the refractive index characteristics and a phase of the measurement-side focus timing relative to a period of the drive signal.

2. The non-contact displacement sensor according to claim 1, further comprising;

a lens controller that operates as a benchmark signal outputter which outputs a benchmark signal synchronized with the drive signal, wherein:

the characteristics calculator calculates the refractive index characteristics of the liquid lens based on a delay time of the first reference-side focus timing relative to the benchmark signal and a delay time of the second reference-side focus timing relative to the benchmark signal, and the position calculator calculates the phase of the measurement-side focus timing based on a delay time of the measurement-side focus timing relative to the benchmark signal.

3. The non-contact displacement sensor according to claim 1, wherein the reference light optical system comprises:

a partial reflecting mirror comprising the first reference surface which reflects a portion of the reference light; and a reflecting mirror comprising the second reference surface which reflects the reference light that passes through the first reference surface.

4. The non-contact displacement sensor according to claim 2, wherein the reference light optical system comprises:

a partial reflecting mirror comprising the first reference surface which reflects a portion of the reference light; and a reflecting mirror comprising the second reference surface which reflects the reference light that passes through the first reference surface.

5. The non-contact displacement sensor according to claim 1, wherein the reference light optical system comprises:

a reference light optical path splitter that splits the reference light that passes through the reference-side objective lens;

a first optical fiber comprising, as the first reference surface, a first reference end face where a first reference light that is split by the reference light optical path splitter is incident; and a second optical fiber comprising, as the second reference surface, a second reference end face where a second reference light that is split by the reference light optical path splitter is incident.

6. The non-contact displacement sensor according to claim 2, wherein the reference light optical system comprises:

a reference light optical path splitter that splits the reference light that passes through the reference-side objective lens;

a first optical fiber comprising, as the first reference surface, a first reference end face where a first reference light that is split by the reference light optical path splitter is incident; and a second optical fiber comprising, as the second reference surface, a second reference end face where a second reference light that is split by the reference light optical path splitter is incident.

7. The non-contact displacement sensor according to claim 1, wherein:

the light source comprises:

a measurement light source that emits the measurement light; and a reference light source that emits the reference light, and the photodetector comprises:

a measurement light photodetector that receives the measurement light reflected by the measurable object and that outputs the photodetection signal triggered by the measurement light; and a reference light photodetector that receives the reference light which passes by way of the reference light optical system and that outputs the photodetection signal caused by the reference light.

8. The non-contact displacement sensor according to claim 2, wherein:

the light source comprises:

a measurement light source that emits the measurement light; and a reference light source that emits the reference light, and the photodetector comprises:

a measurement light photodetector that receives the measurement light reflected by the measurable object and that outputs the photodetection signal triggered by the measurement light; and a reference light photodetector that receives the reference light which passes by way of the reference light optical system and that outputs the photodetection signal caused by the reference light.

9. The non-contact displacement sensor according to claim 3, wherein:

the light source comprises:

a measurement light source that emits the measurement light; and a reference light source that emits the reference light, and the photodetector comprises:

a measurement light photodetector that receives the measurement light reflected by the measurable object and that outputs the photodetection signal triggered by the measurement light; and a reference light photodetector that receives the reference light which passes by way of the reference light optical system and that outputs the photodetection signal caused by the reference light.

10. The non-contact displacement sensor according to claim 4, wherein:
the light source comprises:
a measurement light source that emits the measurement light; and
a reference light source that emits the reference light, and
the photodetector comprises:
a measurement light photodetector that receives the measurement light reflected by the measurable object and that outputs the photodetection signal triggered by the measurement light; and
a reference light photodetector that receives the reference light which passes by way of the reference light optical system and that outputs the photodetection signal caused by the reference light.

11. The non-contact displacement sensor according to claim 5, wherein:
the light source comprises:
a measurement light source that emits the measurement light; and
a reference light source that emits the reference light, and
the photodetector comprises:
a measurement light photodetector that receives the measurement light reflected by the measurable object and that outputs the photodetection signal triggered by the measurement light; and
a reference light photodetector that receives the reference light which passes by way of the reference light optical system and that outputs the photodetection signal caused by the reference light.

12. The non-contact displacement sensor according to claim 6, wherein:
the light source comprises:
a measurement light source that emits the measurement light; and
a reference light source that emits the reference light, and
the photodetector comprises:
a measurement light photodetector that receives the measurement light reflected by the measurable object and that outputs the photodetection signal triggered by the measurement light; and
a reference light photodetector that receives the reference light which passes by way of the reference light optical system and that outputs the photodetection signal caused by the reference light.

* * * * *